United States Patent [19]

Pocock et al.

[11] Patent Number: 5,518,253
[45] Date of Patent: *May 21, 1996

[54] TELEVISED BINGO GAME SYSTEM

[76] Inventors: Terrence Pocock; Andrew Pocock, both of 92 Main Street, Delaware Ontario, Canada, N0L 1E0

[ * ] Notice: The term of this patent shall not extend beynd the expiration date Pat. No. 5,297,802.

[21] Appl. No.: 213,705

[22] Filed: Mar. 16, 1994

Related U.S. Application Data

[63] Continuation of Ser. No. 894,744, Jun. 5, 1992, Pat. No. 5,297,802.
[51] Int. Cl.$^6$ .................... A63F 3/06; A63F 9/22
[52] U.S. Cl. .............. 273/439; 273/269; 273/138 A
[58] Field of Search .................... 273/439, 269, 273/237, 138 R, 138 A, 139; 283/49, 903; 379/92; 358/84, 85, 86; 455/2, 4.2

[56] References Cited

U.S. PATENT DOCUMENTS

| | | |
|---|---|---|
| 3,822,876 | 7/1974 | Frain ............................ 273/269 |
| 4,630,830 | 12/1986 | Gadd . |
| 4,661,906 | 4/1987 | DiFrancesco et al. . |
| 4,669,729 | 6/1987 | Solitt et al. . |
| 4,830,380 | 5/1989 | Six . |
| 4,845,739 | 7/1989 | Katz ............................ 379/92 |
| 4,882,688 | 11/1989 | Kondzlolka et al. .......... 273/269 |
| 4,909,516 | 3/1990 | Kolinsky ..................... 273/269 |
| 5,035,422 | 7/1991 | Berman ....................... 273/269 |
| 5,072,381 | 12/1991 | Richardson et al. . |
| 5,083,272 | 1/1992 | Walker et al. . |
| 5,112,050 | 5/1992 | Koza et al. . |
| 5,297,802 | 3/1994 | Pocock et al. ............... 273/439 |

*Primary Examiner*—Jessica J. Harrison
*Attorney, Agent, or Firm*—Burns, Doane, Swecker & Mathis

[57] ABSTRACT

A system and method to provide a mass audience television game show based on bingo that is played on impulse many times per day. Players use erasable daubers to mark system generated plastic laminated sheets of reusable bingo cards. Entry to the game is by telephone with the automatic acquisition of players names and other information required to play the game. Billing is provided by a '900' number billing service or by charging a players credit card. A computer system plays the selected bingo balls against all the entered bingo cards, determines the winners and announces the winners names over the television channel. This system is totally automated without any staff required to accept players entries or to operate the television game show. A semi-automated version includes an announcer and the selection and display of the bingo balls manually over the television channel as well as the personal announcement of the winners.

31 Claims, 15 Drawing Sheets

FIG. 7

| B | I | N | G | O |
|---|---|---|---|---|
| 1 | 16 | 31 | 47 | 61 |
| 2 | 17 | 33 | 48 | 63 |
| 3 | 18 | 38 | 49 | 64 |
| 4 | 19 | 39 | 58 | 68 |
| 5 | 20 | 40 | 60 | 71 |
| ELEMENT 0001 +0 | ELEMENT 0001 +15 | ELEMENT 0451 +30 | ELEMENT 1055 +45 | ELEMENT 0316 +60 |
| OF THE TABLE OF 3003 | | | | |

| B | I | N | G | O |
|---|---|---|---|---|
| 1, 6, 11 | 2, 6 | 3, 6 | 4, 6 | 5, 6, 12 |
| 1, 7 | 2, 7, 11 | 3, 7 | 4, 7, 12 | 5, 7 |
| 1, 8 | 2, 8 | 3, 8, 11, 12 | 4, 8 | 5, 8 |
| 1, 9 | 2, 9, 12 | 3, 9 | 4, 9, 11 | 5, 9 |
| 1, 10, 12 | 2, 10 | 3, 10 | 4, 10 | 5, 10, 11 |

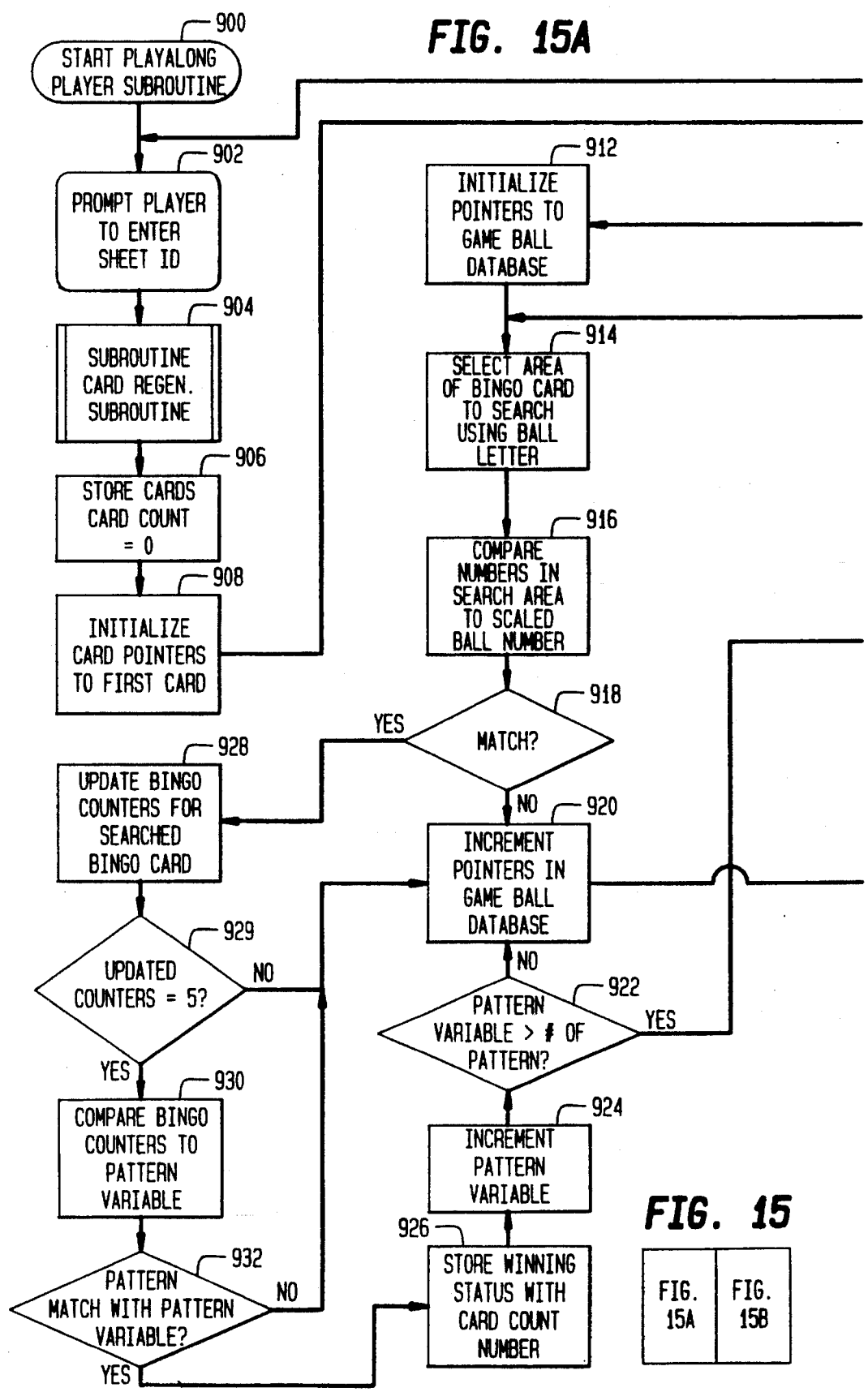

5,518,253

TELEVISED BINGO GAME SYSTEM

This application is a continuation of application Ser. No. 07/894,744, filed Jun. 5, 1992, now U.S. Pat. No. 5,297,802.

FIELD OF THE INVENTION

The present invention relates to televised game shows, and more particularly to a system for playing the game of bingo on a regional or national basis through a televised program.

BACKGROUND OF THE INVENTION

Historically charities have operated local television bingo games once per week with low-value prizes controlled by municipal and state ordinances. The lack of professionalism needed to produce these games, unexciting prize money, infrequency of play and inconvenience of entry has tended to produce television game shows with limited audience appeal. On the other hand large organizations such as state or provincial lottery corporations have not had the means to organize and operate a mass audience television game show that meets their requirements for revenue generation, system integrity, and ease of operation. The objective of this invention is to resolve the problems which inhibit the successful development of a mass audience television game show based on bingo.

In the regular television bingo game the player is required to purchase a bingo card at a local retail store some time prior to game time. The player must then reserve the game viewing time as much as a week in advance from the time the bingo card is purchased. This inhibits ticket sales because the player is not sure if he or she will be available at game time. The player also has to physically be at home and play the game to determine if he or she is a winner, or arrange for someone else to play the bingo card. Players enter only one game at a time and are unable to reschedule games based on their availability. This invention reduces these problems by the use of replayable bingo cards, telephone entry into the game, on demand scheduling and computer-controlled playing of the game.

In the standard television bingo game the winning players telephone the television station to inform the game organizers of their bingo. Multiple players are able to win at the same time and each bingo card must be verbally verified by telephone, which entails twenty five numbers being read back to the verifier for each winning full-card bingo. This process is time consuming, boring for the television audience and prone to both error and pranks since the verification calls are made to a publicly announced telephone number. Pranksters can easily declare a false bingo which interrupts the game for other legitimate players. The day after playing the bingo game the organizers have the expense of sending a staff member to personally verify each winning bingo card and paying out the prize money. The current invention seeks to eliminate all of this manual verification process.

The physical problems of delivering bingo cards to retailers, collecting and controlling the cash, the confusion in the players' minds as to which card is to be played for which game, and the possibility of fraud and pranksters all contribute to the difficulty of expanding the current style of bingo to a mass audience game show covering many cities with game frequencies up to every half hour. This invention eliminates the need to deal with cash or physically distribute bingo cards for each game.

With other lotteries and games of chance operated by the states and provinces, expensive lottery terminals or other input devices such as on-line poker screens are required. These have to be placed in heavy traffic locations to provide economic access to large numbers of potential players. This invention does not require expensive terminal devices because it uses the telephone and television set which are conveniently available in most consumers' homes.

In many computer systems with Touch Tone input, the users have to input substantial amounts of data for each transaction, which can lead to input error, user frustration and extended telephone connect time. Tedious playback verification of the correctness of the input is necessary to maintain the integrity of the system even though time consuming and costly. This invention seeks to reduce player input to a minimum while maintaining data integrity.

The availability of large prize money and the broad geographic coverage of a mass audience bingo game make the prevention and detection of fraud an issue that must be addressed to the satisfaction of the operating bodies. Sheets of bingo cards must be tamperproof, the identity of players and the accuracy of any sheet registration must always be available for immediate verification. In most cases gaming systems are required to place some form of restriction on the entry of minors. The present invention enables security measures to be employed that detect and avoid both fraud and misuse.

It is important to the credibility and reputation of a state or provincial lottery corporation that the television bingo game system operate reliably without error or detectable failure, particularly under the scrutiny of a large television audience. This invention seeks to maintain reliability through fault tolerant design and redundant system capabilities.

The number of potential bingo cards is over 244 quadrillion each with twenty five bingo numbers. Even with current technology it is uneconomical to store all the possible bingo cards for retrieval and play in a television bingo game. Players on the other hand expect their cards to be unique for every game, and to have an equal chance to play their card against any other card. Also, a bingo ball must be played against all the cards in play rapidly in the time it takes to select a bingo ball and show it to the audience and have them mark their cards. The algorithms that create and play the bingo cards must be perceived as being fair by the players and efficient by the bingo game organizers. The algorithms of this invention enable all bingo players to have unique cards and for the bingo cards to be processed in a timely fashion.

It is difficult in the standard weekly television bingo game to print a large assortment of different bingo cards. Standard bingo cards are printed in multiple similar copies from printing plates and then assembled together into sets for distribution to many locations marked for play on different nights. These bingo cards are used one time and then thrown away. This invention creates a unique bingo card that can be reused many times and need not be thrown away unless damaged.

With a mass television audience game show it is easily possible for 1,000,000 players with six bingo cards per sheet to be entered in a bingo game. Each single bingo card has 25 integers, thus a sheet of bingo cards consists of 150 integers. Each integer is stored as two bytes of data, totalling 300 bytes for one sheet of bingo cards. For 1,000,000 sheets of bingo cards, 300 Megabytes of uncompressed storage is required. This data of approximately 300 Megabytes is significant both to store and process in the time it takes to select and inform the audience of the next bingo ball. It is an objective of this invention to significantly reduce the data to be stored and processed.

The only family members interested in watching the current television bingo game shows are those individuals who have purchased a bingo card sometime during the previous week. Other family members are likely to want to watch a different television show since they have no reason to watch the televised bingo game. This significantly reduces the potential audience for the television game show and creates ill will within the family. The present invention seeks to create a family television game show that is of interest to all members of the family.

In the current versions of television bingo the organizers have no information concerning the individuals who are playing their bingo game since each card is purchased anonymously and used only once before being thrown away. Without having this information continuously available organizers cannot perform database operations such as: automatically award free games based on user criteria, recognize first time players, determine a player's frequency of play, eliminate name and other identification keystrokes, announce winners' names, bill credit accounts or verify who the winners are. This invention creates and uses computer databases to add new functionality to the playing of television bingo including the authorization of a player's on-site agent.

Current television bingo games generally do not accumulate data from successive bingo games. This lack of current and previous game statistics prohibits the announcers from providing meaningful commentary as the game progresses, which is of interest to most players. This invention collects and makes available current and historical game statistics.

In the current version of television bingo a large staff is required to provide the following functions: pick and display bingo balls, record the balls as picked, verify multiple winning bingo cards from player telephone calls, verify in the field the previous night's winners and award the prizes and finally distribute bingo cards to all the retailers for each game and collect the cash. As all of these functions must be physically carried out by staff it makes it difficult to operate a high frequency television bingo game. The present invention enables the television game to be operated automatically without staff.

The announcers and television bingo staff are generally volunteers without game show experience or television ability, which has a tendency to produce a non-professional, low entertainment value game show. The staff also doesn't have the ability to generate electronic tools such as animation, instant display screens, pseudo characters with computer generated voices, or fast automatic access to on-air interviews with winners. This invention eliminates the requirement for on-screen staff and provides computer generated functions that replace many human functions.

In many systems where entry and billing is by telephone the expense of live operators is required twenty four hours per day to manually acquire individuals names and place them in a text database. An announcer is also required to speak the individuals names, which inhibits the operation of a totally automated game show. This invention eliminates the requirement for most operator functions.

The market size of a television bingo game varies substantially from a small local municipality up to a national game show with massive entries. The speed of processing of an individual bingo ball however must remain roughly the same regardless of the size of game. The system must also be able to economically handle a varying number of telephone calls with acceptable call blockage to meet the market demands of different sized television bingo games. This invention provides a system to play television bingo that is flexible with the ability to play any size of bingo game.

Bingo is probably the best known game in the English speaking world. The problems described above have prevented bingo from becoming an entertaining game show for the whole family to play on a daily basis from any home that has a telephone and a television set. This invention addresses and removes such problems.

SUMMARY OF THE INVENTION

The disclosed invention provides a system and method that overcomes the deficiencies of the prior art as previously noted. According to the invention, any of the more than 244 quadrillion possible unique bingo cards are generated for assembly into the required number of defined sets of bingo cards. Each set of multiple bingo cards is printed on a single sheet of paper by a computer-controlled variable page content printer. Each sheet also has a unique computer generated identification number printed on it. These sheets of bingo cards are distributed to potential bingo players in the television station's viewing area.

in a preferred embodiment each sheet of bingo cards is laminated in plastic so that erasable daubers are used to mark the bingo numbers as they are called. Upon completion of the game the sheets are wiped clean, ready to be reused in a future game. The plastic laminate is rigid enough for the player to use on his lap sitting in front of the television set. The erasable dauber is attached to the sheet of bingo cards by a cord so that the dauber and the sheet are not easily misplaced.

A telephone system is attached to the computer system that generates and speaks voice messages, digitally records and stores voice messages, accepts Touch Tone input, connects a terminal operator with bingo game players, and bridges a player to an announcer so that the television audience hears their conversation. This telephone system also automatically accepts players entries, bills them for playing, informs them of their winnings and generates pseudo voices to increase the entertainment value of the bingo game show.

In a preferred embodiment the automated voice response unit of the telephone system prompts Touch Tone entry of information from the bingo players. Alternately, the players without Touch Tone telephones speak their entries into a telephone system equipped with voice recognition capabilities.

A player is only required to input the sheet identification number since the system speaks the player's name associated with the identification number to have the player confirm that he is the player for that set of cards.

This sheet identification number can also be obtained manually by a customer service operator linked via the telephone system to a bingo player who doesn't have a Touch Tone telephone. The customer service representative inputs the information into the computer system via her terminal.

The sheet identification number is associated on entry with a date and time stamp of the transaction and stored with other information to provide an audit trail for each entry.

The above terminal, voice recognition or Touch Tone transactions are stored as digital data. It is preferable however to also digitize and store a recording of the complete transaction to resolve any future disputes regarding the transaction. These transactions and other historical data are backed up onto WORM (Write Once Read Many) discs for a permanent record of entries into all the games.

To further protect against fraud the sheets of bingo cards are printed on paper with an embedded hologram, similar to a credit card. The plastic laminate is also holographically embossed so as to be attractive as well as difficult to tamper with.

The computer system uses each player's sheet identification number to regenerate the set of bingo cards printed on that sheet. These regenerated cards are stored in a first database in preparation for playing the next bingo game and preferably the second database of bingo game information is also updated with the information from the entry transaction.

Winning bingo patterns are entered into the computer system to set up the criteria for determining the winners of the next bingo game. Bingo numbers are then randomly selected one at a time, shown to the television audience and entered into the computer system.

The computer system takes each bingo number as selected and determines if it matches one of the numbers on the stored bingo cards. If there is a match the computer increments the bingo pattern counters for the position of that number to determine if a pattern on that card matches a winning bingo pattern previously entered.

When a match is found the computer system obtains the player identification associated with the winning bingo card. The player's telephone number is displayed over the television channel or alternatively the player's name is announced as it was recorded in the database, alternatively the recorded name is converted to text for either display to the audience using the text generator or provided to the announcer on his terminal.

The telephone system automatically telephones winners and by voice response informs them of their winning status and bridges them to the television announcer and to the television audience for an on-air interview.

Since this invention regenerates the bingo cards on any sheet it is possible for non-paying individuals at home to play along with the players who have paid to play. When the play-along player obtains a bingo prior to or simultaneously with a paid player he calls in to the telephone system and enters the winning sheet's identification number. The computer system regenerates the bingo cards on the sheet, plays them against the bingo numbers as previously selected to determine if the play-along player is a confirmed winner.

The computer system of this invention maintains databases of bingo information including data about the sheets of bingo cards, player information, bingo transactions and game statistics. These databases allow the system to recognize first time players, players who have not played lately, the frequency of play of any players, players who have won free games and multiple players from one household. This database of information is acted upon to generate special messages, automatically telephone players and award free games or other predetermined activities. In certain situations the database contains an indication that the player authorized an on site agent to enter and play his bingo cards. The authorizing transaction is not only stored in the on line database but stored in a WORM device for historical audit purposes.

The database of the current and past bingo game statistics is used to add interest to the game as it is being played through a text display on the screen, comments from the live announcer or by computer generated voices of pseudo announcers.

Free games are awarded players that match a particular criteria or are awarded to players currently playing whose sheet numbers end with a certain number or other method of selection. This free game award is automatically entered in the database and processed as an entry for the next game so that the players who know they have been awarded a free game do not need to call in to enter.

In the preferred embodiment of the invention players dial a '900' number set up by the telephone company to communicate with the bingo game telephone system. This '900' number authorizes the telephone company to automatically bill the player for the charges to play bingo on the player's next telephone bill. Alternatively, where a player is calling from an office where he is unable to use a '900' number the game charges are directed to the player's personal credit card account. In other situations players are able to bill regular charge accounts to play and be billed by the system as required.

A digitized audio database of individuals names associated with each bingo sheet identification number is created as players enter their sheet identification number for the first time. This database is used to confirm individual players' names each time they enter a sheet identification number for another game. A new name is requested only if a player wishes to play someone else's previously registered sheet or to enter a new sheet of bingo cards.

This invention facilitates the playing of the complete bingo game automatically. Once the computer generated sheets of bingo cards are distributed in the television station's viewing area, bingo players call into the telephone system to automatically enter their sheet identification numbers. A Telephone Company '900' number service bills the players automatically or they enter a credit card number using the Touch Tone keypad for billing. Complete transactions are digitized and stored for audit and security purposes.

Images of the winning game patterns are automatically displayed to the audience using the graphics-generating function of the system and the audience is also informed of the rules by the voice response system over the audio portion of the television channel.

At game time the bingo cards are automatically regenerated by algorithms that reference the sheet identification number. The computer then creates the bingo numbers randomly and displays the bingo ball images to the viewing audience and checks each card to see if a winning bingo pattern has been obtained. During the game the computer system automatically creates comments for the viewers in the same voice used to prompt input from the telephone system. These comments interact with the statistics as the game progresses. An announcer's voice is also created to interact with the computer's pseudo personality and the ongoing playing of the game. Winning game patterns and other messages are displayed by the text and graphics generator and automatically interacted with the pseudo personalities. Audio messages describe the rules or augment the video messages. When winners are determined their names and identification numbers are provided over the air and the winners are automatically called by the telephone system to inform them of their winnings.

When games are run automatically it is possible to substantially increase the game frequency. In these circumstances it is preferable to allow a player to enter as many games at one time as required and to reschedule games on demand.

Although it is contemplated that a player plays the complete set of bingo cards on a sheet, each separate bingo card is identifiable to the computer system to play any of the bingo cards on the sheet individually.

Check digits are used to verify the correctness of data such as sheet and player identification numbers as they are entered so as to avoid input error before it enters the system.

Since the number of potential bingo cards is extremely large players are able to use their individual cards for life without any possibility of there being a duplicate to their card. Replacements for cards lost or damaged are created at any time by regeneration from the sheet identification number.

A significant aspect of this invention is the ability of the computer programs to generate and print the millions of unique bingo cards and then regenerate them at a later time for automatic play by the computer system.

These computer programs compress the data so that storage is manageable with current technology and all the bingo cards are played by the computer in less time than it takes to select and display each bingo ball to the television audience.

When the elements of this invention are combined together it is possible to organize and operate a mass audience bingo television game show that is played multiple times per day.

DESCRIPTION OF THE DRAWINGS

FIG. 7 illustrates a sample bingo card.

FIGS. 15a and 15b are flow charts of the Play Along Player Subroutine.

DETAILED DISCLOSURE

This invention pertains to a system and method to play a television game show based on bingo. The invention provides a fully automatic system with minimal staff requirements as well as a semi-automatic system that uses announcers and other staff members to provide the game show with a different personality.

Figure 1:
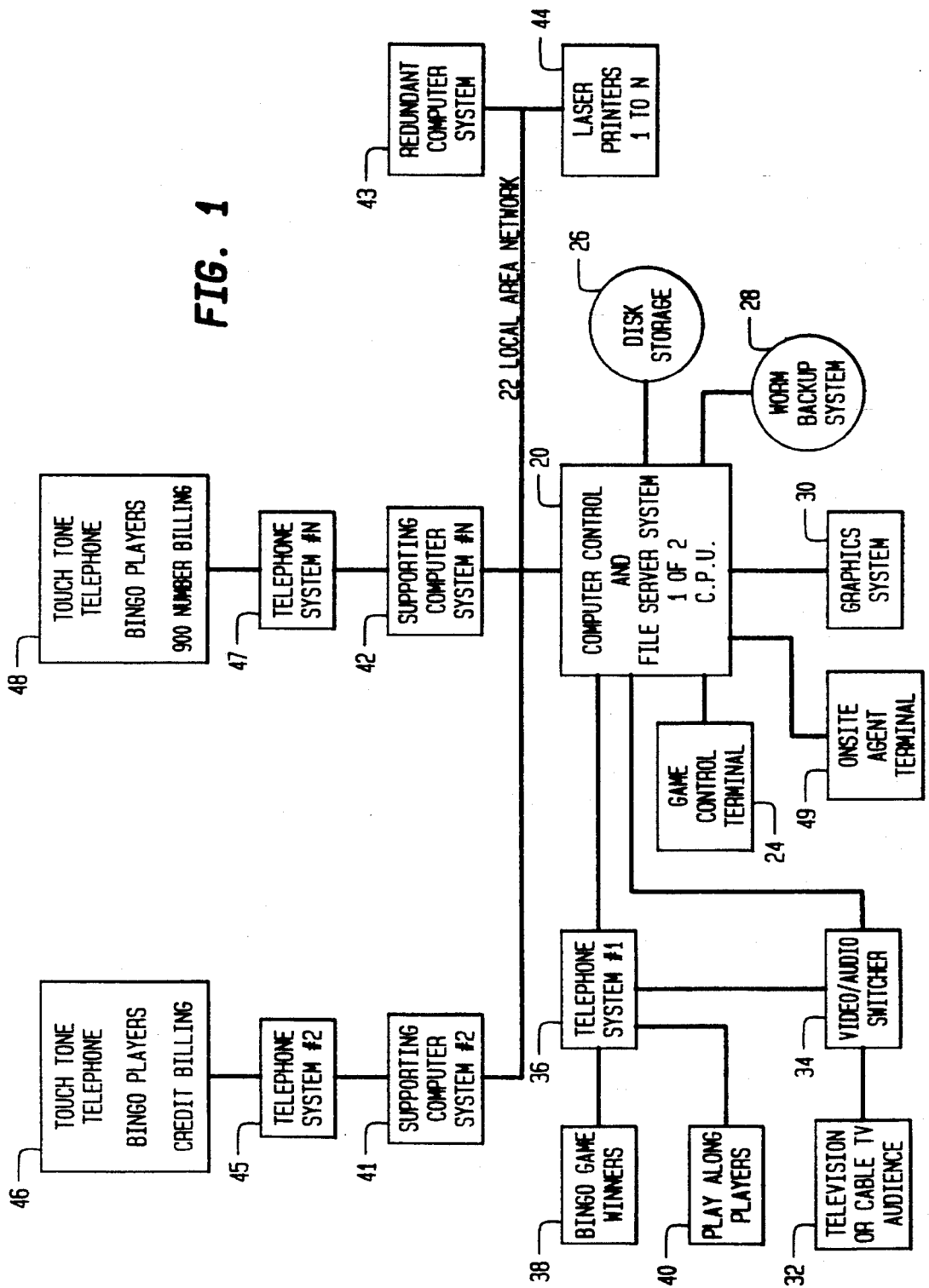
FIG. 1 is a block diagram of the system components to play an automated televised bingo game.

Referring more particularly to FIG. 1 there is shown a generalized block diagram illustrating a computer supported television game show system that prints bingo cards and automatically plays a televised bingo game. This system includes a general purpose CPU 20 which controls all aspects of the invention and also acts as a file server connected to a LAN (Local Area Network) 22. The computer system is controlled by instructions that are input into the Game Control Terminal 24. The CPU 20 contains the computer programming means to startup, interact with, and control all the peripheral devices that make up the television bingo system. A disk storage system 26 is directly connected to the CPU 20. The disk stores all the files and programs for the system which are shared by the other computer processors connected to the LAN 22. The files stored in the disc storage system are described more fully later in this disclosure.

Files are directly backed up on to a connected WORM (Write Once Read Many Times) disk 28; a non erasable removable compact disk system that provides overall system security, protection from fraud and a permanent audit trail of all transactions.

A graphic display system 30 is an integral part of the CPU 20 and outputs colored text and graphics of winning bingo patterns, instructions, and other information of interest to the players. The graphic display system outputs to the television audience 32 through a video/audio switcher 34 which blends various picture and audio sources together to produce the television signal. A telephone system 36 is also connected to the CPU 20. The telephone system 36 accepts Touch Tone (DTMF) input and converts it to digital data for use by the CPU 20. It prompts for user input by voice response and accepts voice input by voice recognition from players without Touch Tone telephones. The voice generating function of the telephone system which when directed by the CPU 20 speaks audio messages describing the bingo game to the audience 32 through the switcher 34. The telephone system 36 has the ability to dial out to bingo game winners 38 and inform them of their winnings by voice response and to bridge together players, announcers, or customer service operators. The telephone system 36 also accepts calls from play along players 40 who input their bingo sheet identification numbers which the CPU 20 uses to verify if they are winners.

The local area network 22 links the CPU 20 with a series of N supporting computer systems 41 and 42 and a redundant computer system 43. The supporting computer system #2 41 directs and controls the attached telephone system #2 45 connected to it that accepts calls from bingo players who want to pay by credit 46. This telephone system #2 in the preferred embodiment has voice response means to prompt the players to input the identification number of the sheet of bingo cards and other required information. The telephone system also has Touch Tone (DTMF) decoding means so that it converts the players Touch Tone (DTMF) input to ASCII characters for transmission to the supporting computer system #2 41. The supporting computer system processes the bingo sheet identification number to generate the bingo cards contained on the players sheet and stores these in the memory of the supporting computer system as well as transmitting the data of the transaction via the LAN 22 to the CPU 20 for storage in the Bingo Game Database in the disk storage system 26.

In a similar fashion the supporting computer system #N is connected to a telephone system #N that accepts calls from bingo players with Touch Tone (DTMF) telephones that use a '900' billing service provided by the telephone company to pay for their bingo game. In a preferred embodiment of the invention the telephone systems has voice recognition capability so that bingo players without Touch Tone (DTMF) telephones input the required information by spoken words and numbers. In the diagram of FIG. 1 just two supporting computer systems are shown 41 and 42; however, the number of these systems connected to the LAN 22 is varied accordingly to the number and distribution of the player telephone calls to enter the bingo games. For example where a bingo game is being played once each day, and telephone entries on average take 15 seconds; with 50% of the entries occurring in the last hour prior to game time; and with a supporting computer that is able to manage 60 telephone ports then 4 calls/min.*60 min.*60 ports=14,400 calls (approx.) for the busy hour or approximately 30,000 calls per day are processed by the one support system. It is the intention of the invention to store the regenerated bingo cards for the days 30,000 entries in the memory of the support computer system 41 and to play the bingo game for these entries using the computing resources of the support computer system 41. The support computer system 41 reports any winners among its players to the main CPU 20. The support computer 41 processes every bingo card for each bingo ball selected and the processing for each ball is completed in the time it takes to draw and display the next bingo ball.

The telephone systems 45 and 47 acquire player names and other information; digitally record it and transmit this information via the LAN 22 to the CPU 20 for storage and retrieval on the disc storage means 26.

In one embodiment of the invention multiple remotely located telephone systems are connected to the computer system using high speed data communication links. For example in a national bingo game with entries coming from different regions all across the country, the players telephone a local telephone number at no cost where their entry is taken, and the entry information is transmitted over these high speed data links.

It is possible for one of the support systems to fail during the period of accepting entries without prospective players perceiving a system failure since there are multiple support computer systems. However, during the televised game the loss of one of the support systems playing bingo with approximately 30,000 entries is unacceptable. A redundant computer system 43 is connected via the LAN 22 to the CPU 20 to serve as a backup processor in case of failure of one of the support computer systems. When there is a failure the entries stored in the disk storage 26 associated with the failed support computer system are down loaded over the LAN 22 to the redundant computer system 43 along with a file of the bingo balls in the order they were selected. The redundant computer system 43 replays the selected balls against the entries and bring itself up to date, then notifies the CPU 20 that it was ready to take over from the failed system. All supporting computer systems commence play again on direction of the CPU 20.

The CPU 20 is shown in FIG. 1 in a single processor configuration; however, for redundancy purposes another similar system is attached to the LAN 22 and constantly updated so that control of the overall system is maintained should the main CPU system 20 fail.

The numeric content of each bingo card is calculated by CPU 20 and printed by one of a series of laser style printers 44 attached to the LAN 22. Alternatively, the images of the bingo cards are written to the WORM 28 and the removable CD plater transported to another site to print the bingo cards.

The on site agent terminal 49 is connected to the CPU 20 which displays when a player who has authorized an on site agent to play their bingo cards as though the player was physically on the bingo location has won a bingo game.

The above description of FIG. 1 outlines an automatic system requiring the minimal human involvement to operate the bingo game. Entries are taken, players names acquired, the bingo game played, and the winners informed automatically without operational staff.

Figure 2:
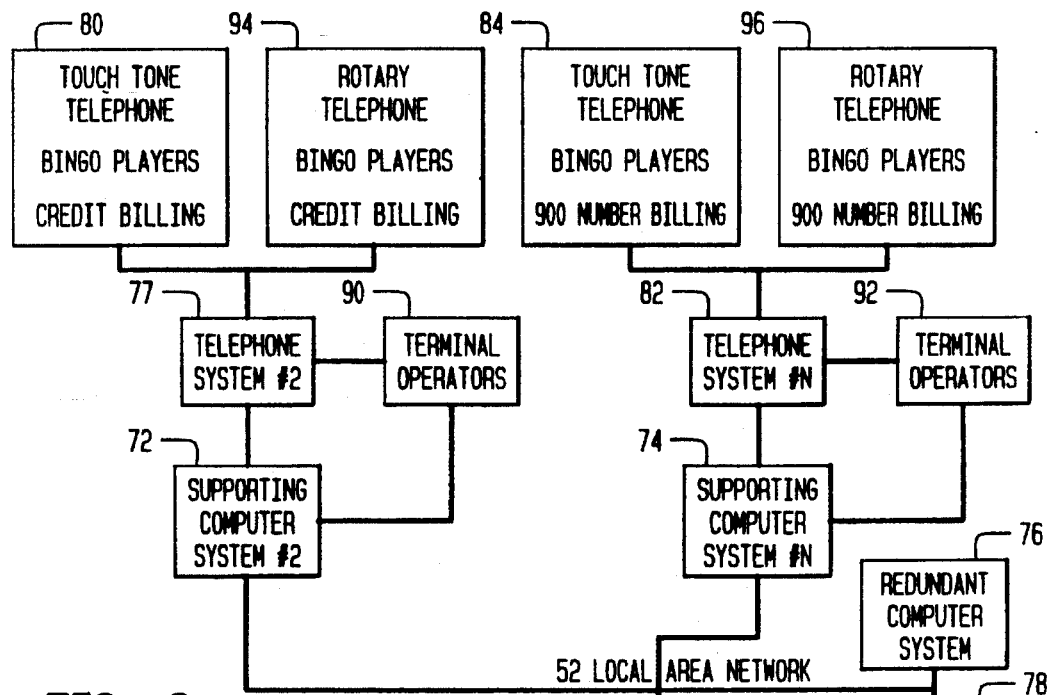
FIG. 2 is a block diagram of the system components to play a semi-automated televised bingo game.
Figure 2:
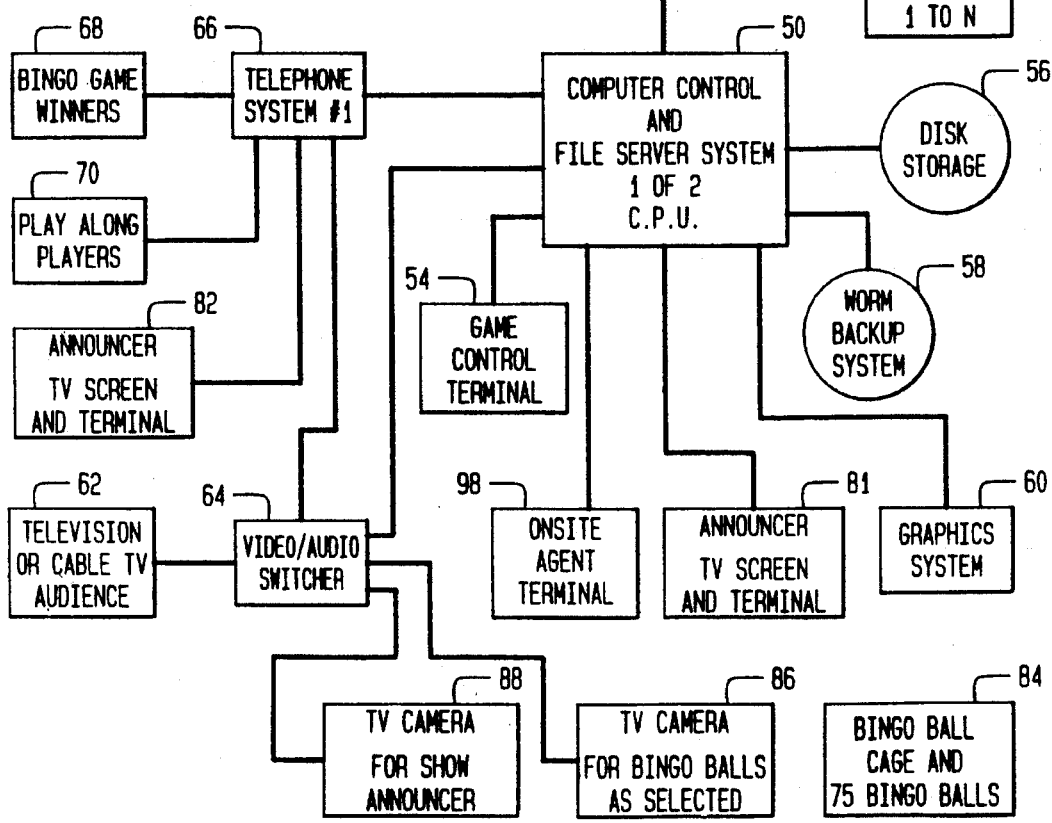

FIG. 2 illustrates a similar semi-automatic system, with an operating staff to provide additional functionality that is not offered in the automatic system illustrated in FIG. 1.

There are many components in the semi-automatic system of FIG. 2 that perform the same function as they did in FIG. 1, Computer Control and File Server 50, LAN 52, game control terminal 54, disc storage 56, WORM backup 58, graphics system 60, television audience 62, video/audio switcher 64, telephone system #1 66, bingo game winners 68, play along players 70, support computer systems 72 and 74, telephone system 77 and 82, two types of bingo player input 80 and 84, redundant computer system 76, and the laser printers 78 all perform the same functions as in FIG. 1.

In the semi-automatic system there is a live announcer who has a television screen and input terminal 80 to receive messages from the CPU 50 and to input commands to obtain information or to pace the television program. The announcer also has a telephone 66 that is bridged to a winner 68 and linked through the switch 64 to the television audience 62 for an on air interview with the winner. In the semi-automatic system the CPU 50 doesn't generate the bingo balls. Bingo balls are manually selected from a bingo ball cage 84 and shown to the audience 62 via the switcher 64. Television cameras 88 and 86 transmit pictures of the announcer, the ball picking process, and all other visual facets of the bingo game to the television audience 62.

Terminal operators 90 and 92 are connected via the telephone system 77 and 82 to the bingo players who have rotary telephones 94 and 96 and verbally receive the players entries and input them into the system via their terminals. These same operators intercept calls from players who are having difficulty with input as well as calling winners or other customer contact functions.

The on site agent terminal 98 is connected to the CPU 20 which displays when a player who has authorized an on site agent to play their bingo cards as though the player was physically on the bingo location has won a bingo game.

It may be advantageous to use the telephone company's Dialled Number Identification Service (DNIS) where calls to different telephone numbers to register, receive bingo cards or obtain information are forwarded to the same set of customers service representatives who are automatically informed of the telephone number dialled into the system so they respond appropriately.

The fully automatic system of FIG. 1 is used in certain circumstances where continuous play is important. In other cases where interactions with human personalities are desired then versions of the system in FIG. 2 are used.

In the preferred embodiment of the invention the computer system has multi-tasking and multi-processor capability so that processing capacity can be expanded as required and multiple operations run simultaneously. This type of configuration lends itself to fault tolerant computing where the computer system is designed without a single point of failure. The system has the ability to detect the malfunction of a component and to electronically remove the faulty component from operation without taking the whole computer system out of service.

Although Bingo is probably the best known game in the English speaking world most people are unaware how the numbers on the bingo card are created. A bingo card has five columns containing five numbers each. Each column is referred to by the letter over top of it. Thus there is a 'B' column, 'I' column, 'N' column, 'G' column, and an 'O' column which together spell out the name of the game BINGO. The five boxes in the 'B' column only contain the numbers from 1 to 15 in random or ascending order and none of the five numbers in the boxes are duplicates.

The numbers under the 'I' are generated in a similar way by selecting the five numbers from between 16 and 30 instead of between 1 and 15. Similarly the numbers under the 'N' are selected from 31 to 45, under the 'G' from 46 to 65, and the 'O' from 66 to 75. It can be seen that if a method was determined to generate the numbers under the 'B' then the numbers under the I,N,G and O are determined by adding 15, 30, 45, and 60 respectively to those numbers under the 'B'.

The five separate numbers that are generated using the digits between 1 and 15 start at 1, 1, 1, 1, 1, and end at 15,15,15,15,15, for a total of $15^5$ or 759,375 possible numbers. However, if all the duplicate numbers are removed there are only 3003 unique five digit numbers that are made up from the digits between 1 and 15. For the five digit number to be unique there cannot be any duplicate digits within the number and there is only one number generated from the set of 5 digits ie. only one of the following numbers is unique 1,2,3,4,5 or 5,4,3,2,1, not both or any other combination of these same 5 digits within the 5 digit number.

Figure 3:
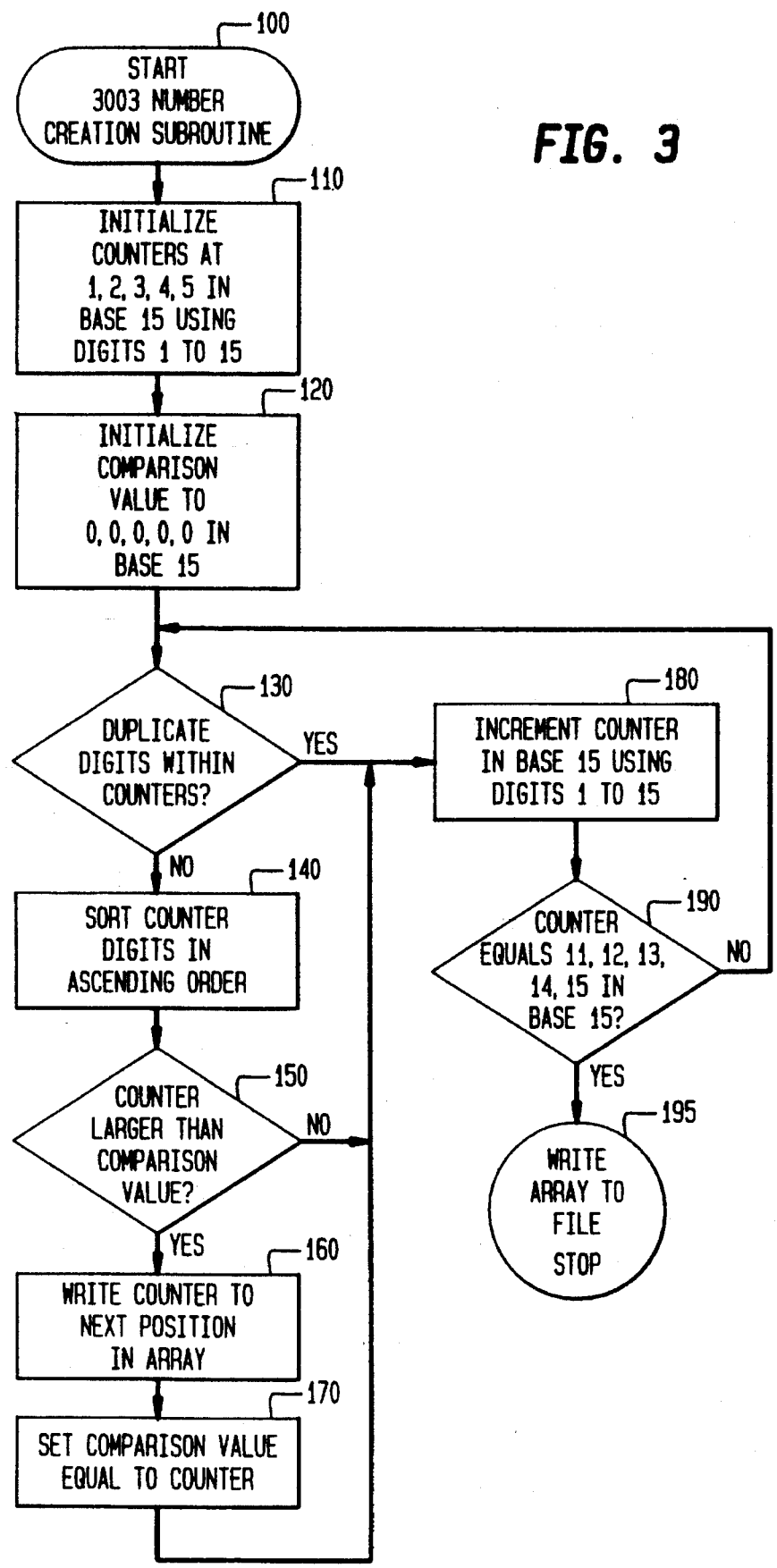
FIG. 3 is a flow chart of the generation of the 3003 unique 5-digit numbers that produces the Table of 3003 numbers used to create all the bingo cards.

All bingo cards are derived from the 3003 unique 5 digit numbers created using the digits between 1 and 15. FIG. 3 illustrates the computer programming means to generate a table of these numbers. The 3003 Number Creation Program is read into the computer system and started 100. The program first defines all the variables and initializes 5 nested counting loops that start at 1,2,3,4,5 respectively and end at 11,12,13,14,15 respectively with each counting loop incrementing by 1 110. In 110 the phrase 'in base 15' is used to indicate that the counter variables ie. the digits, count from 1 to 15 and then reset to 1. Comparison variables are initialized at 0,0,0,0,0 120. At 130 the program determines if there are any duplicate digits within the 5 counters. If there are duplicate digits the counters do not represent one of the unique 5 digit numbers. The program then increments the counters 180 and checks to see if it has reached its maximum count value 190. If the program has reached its maximum count value of 11,12,13,14,15 then the computer outputs the stored array of 3003 unique numbers and stops 195. If the maximum count has not been reached the computer returns to 130 to check the new number for duplicate digits. In the preferred embodiment of the computer program the digits of the number are arranged in ascending order. If there are no duplicates the computer sorts the values of the counter variables in ascending order 140. At 150 the computer compares the sorted values of the counter variables to the comparison variables. If the counter values are all higher then the comparison variables then the computer has found the next unique 5 digit number in the Table of 3003. The computer takes this unique number and writes it to an array 160. The comparison variables are then set to the values of the counter variables 170. The comparison variables contains the last unique number so that further combinations of the same digits are not written into the array. For example the first unique number is 1,2,3,4,5. When the counter variables reach this number the computer records this number in the array and sets the comparison variables to 1,2,3,4,5. When the counter variables become 2,3,4,5,1 the computer sorts the value of the counter variables into ascending order of 1,2,3,4,5. When the computer compares the value of the counter variables to the comparison variables the comparison fails because the counter variables are not greater then the comparison variables; thus stopping the number being written to the array. After the comparison variables are set to the counter variables 170 the computer increments the counter variables 180 and then proceeds to 190.

The program continues until the complete Table of 3003 numbers is generated. The Table generated by the above subroutine is very ordered the actual entries within the Table of 3003 might be randomized. For example the first unique number is 1,2,3,4,5 but this does not have to be in the first location of the table for this invention. If the Table of 3003 is randomized then the bingo cards initially look more random and less ordered. This table is used to create all the bingo cards for printing and to regenerate the same bingo cards at a later date by derivation from a reference number associated with a bingo card or set of cards.

The total number of unique bingo cards that can be generated from these sets of 3003 numbers under the 'B', 'I','N','G','O' is $(3003)^5$ or 244,217,432,431,215,243 separate bingo cards.

A sample Table of 3003 showing the first and last unique numbers is attached in Appendix A.

Any bingo card is specified by reference to a set of five of these separate 4 digit numbers between 0001 and 3003 from the Table of 3003. Each of these five numbers represents one column on the bingo card. If the five numbers that specify a particular card are 0003, 2961, 3001, 2943, and 0015, then the 'B' column contains the 5 unique numbers in the 3rd location of the Table of 3003; the 'I' column contains the 5 numbers in the 2961th location in the Table; the 'N' column contains the 5 numbers in the 3001th location in the Table; the 'G' column contains the 5 numbers in the 2943th location in the Table; and the numbers in the column under the 'O' contain the 5 unique numbers from the 0015th location in the Table of 3003.

The numbers in the Table of 3003 are between 1 and 15 and are only applicable to the 'B' column. However, for the 'I','N','G', and 'O' columns these numbers must be scaled upward. That is the numbers in the Table of 3003 pointed to by the 'I' column specifying number must have 15 added to them. The numbers in the Table of 3003 pointed to by the 'N' column specifying number must have 30 added to them. The numbers in the Table of 3003 pointed to by the 'G' column specifying number must have 45 added to them. The numbers in the Table of 3003 pointed to by the 'O' column specifying number must have 65 added to them. It can be seen that any bingo card out of the more than 244 quadrillion are represented by five numbers which point to locations in the Table of 3003.

Although this invention describes creating the numbers on the bingo cards from calculations based on the 3003 unique numbers that are generated using the digits 1 to 15, there are other options that may from time to time be required. In the current example the numbers on the bingo cards are arranged in sorted order with the smallest at the top of the card and largest at the bottom. This allows the players to mark their cards quickly and speeds up the computer processing; however, randomizing the five digits in the Table of 3003 only once creates a random distribution of the five digits. This table is regenerated at any time in the future by using the standard randomizing algorithm.

In other situations players might want their bingo cards arranged in vertical sets of three cards with every digit between 1 and 15 occurring in the vertical column under the 'B ' and likewise for the remaining columns. This involves creating a Table of 1001 sets of 15 digits in a similar fashion to the Table of 3003. If desired these digits are randomized in the Table of 1001 and the corresponding number of 15's are added to the contents of the table to represent the number under the 'I', 'N', 'G', 'O' respectively. The sets of these cards are generated in a similar fashion to the cards using the Table of 3003 however the total number of cards is only $(1001)^5$ or 1.005 quadrillion possible sets.

Figure 4:
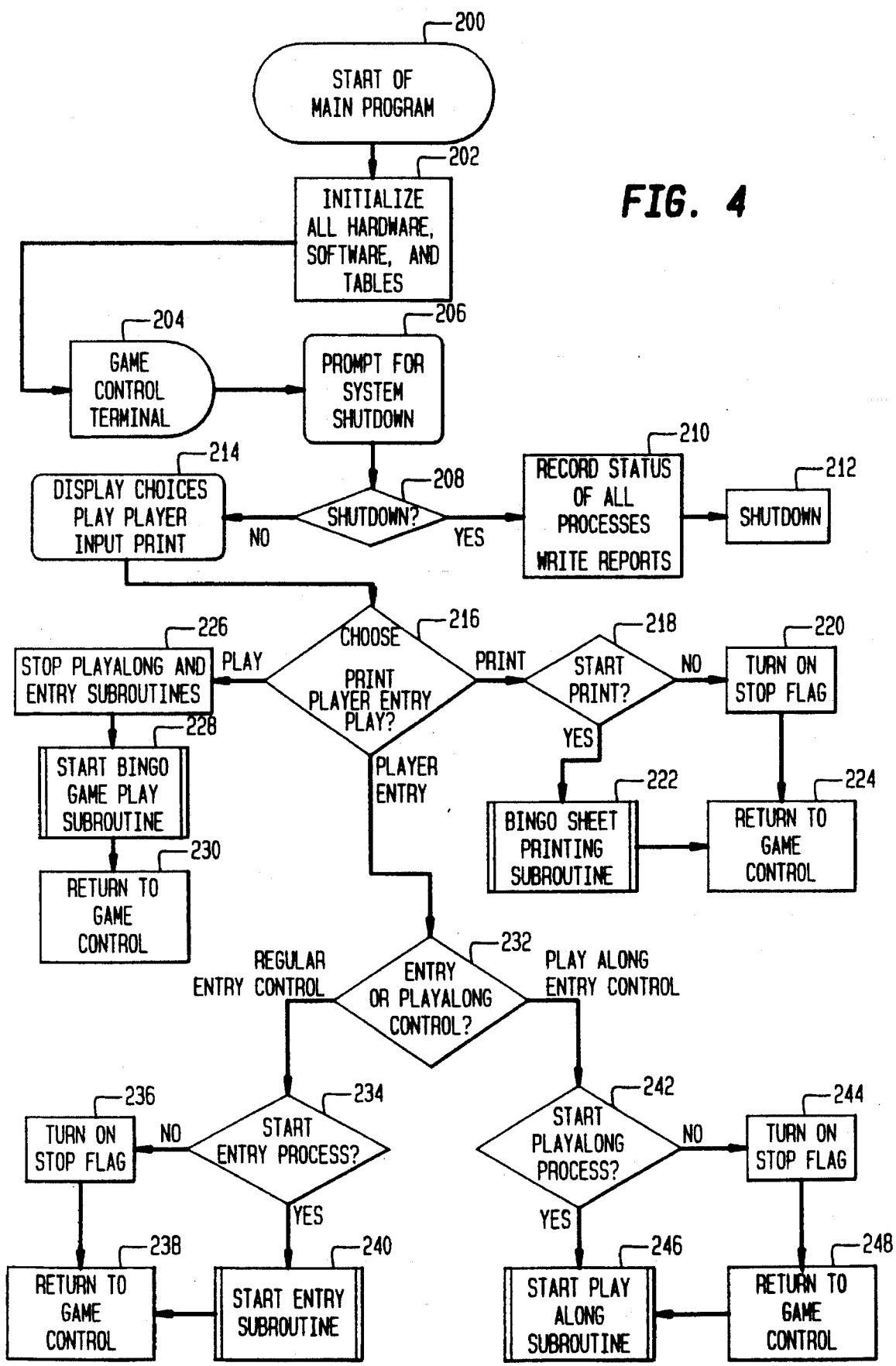
FIG. 4 is a flow chart of the Main Control Program.

The Main Program controls all the Subroutines and processes that print the sheets of bingo cards and allow a mass audience to play the televised bingo game. The Main Control Program is illustrated in FIG. 4. All the Subroutines called by the Main Control Program are described later in this disclosure. At 200 the Main Control Program and Subroutines are loaded into the computers memory and the program started. All hardware, software, and tables are initialized 202.

The hardware runs a self diagnostic check for faults and informs the operator of its state and attempts to replace any faulty components of the system with redundant components.

The software is initialized and confirms that the components are correctly loaded in memory and communications between all devices are operational.

The tables to be initialized are the Table of 3003 Unique Numbers and the Table of Sheet Information which holds the Sheet Offset and the Card Offset in both base 10 and base 3003 as well as the number of cards per sheet. If sets of three cards are required containing the numbers 1 to 15 under the B etc. then the Table of 1001 is initialized and the Table of Sheet Information is initialized with the sheet offset for the Table of 1001 and the Card Offset in both base 10 and base 3003 as well as the number of sets of 3 cards per sheet.

The system is controlled by an operator who is prompted to input commands through the terminal 204. The operator is first prompted whether the system should shut down 206. If the operator directs the computer to shut down 208 the computer outputs a status report to the operator 210. The computer then shuts down the bingo process 212. If the operator prompts the computer not to shut down 208 the computer displays the operator control choices 214. The operator is asked to choose whether he wants to work with the Bingo Printing Process, Bingo Player Entry Process, or the Bingo Play Process 216.

The operator stops or starts the Bingo Printing Process 218 which generates, formats, and transmits via the LAN 22 the bingo cards to be printed on the connected laser printers. If the operator starts the Bingo Print Process the computer proceeds to the Bingo Sheet Printing Subroutine 222 and begins the card printing process and returns back to Game Control 224. If the operator chooses to stop the printing process the stop flag is turned on 220 and the Bingo Printing Process is stopped after the sheet presently being printed is completed. The computer then returns to game control 224 after outputting any status reports.

When the operator chooses to start the Bingo Play Subroutine 216 the computer automatically stops the Bingo Player Entry Process and the Play Along Player Process 226. This is done by busying out the telephone ports of the system as the call on each port is finished. The reason for stopping these processes is to stop new players from entering the game after its started to play. The computer then starts the Bingo Game Subroutine which runs the entire play process of selecting the balls, searching the bingo cards for winners, and informing the winners 228. When the Bingo Play Subroutine is finished control is returned to the Main Control Program.

If the operator chooses to work with the Player Entry Process the computer prompts the operator to choose between the Play Along or the Regular Entry portion of the player input areas 232. When the operator chooses the Regular Entry Process they are prompted to decide whether to start or stop the Entry Process 234. If the operator chooses to start the Entry Process the Entry Subroutine is commenced 240. Once the Entry Process has been initialized the computer returns to Game Control 238. If the operator chooses to stop the Entry Process the operator turns on the stop flag and the Entry Process is gracefully stopped as each telephone port is busied out after completing its call. Once all reports are received by the operator the computer returns to Game Control 238.

If the operator chooses to work with the Play Along Process 232 the operator is prompted to either stop or start the Play Along Process 242. If the operator chooses to start the process the computer commences the Play Along Subroutine 246 and then return to Game Control 248. If the operator chooses to stop the Play Along Entry Process a stop flag is turned on and the Play Along Process is shutdown gracefully, reports are generated and the system returns to Game Control 248.

All parts of the Main Control Program 200 run simultaneously and the operator interrupts any process and displays the status of the process at any time through the game control terminal 204.

Figure 5:
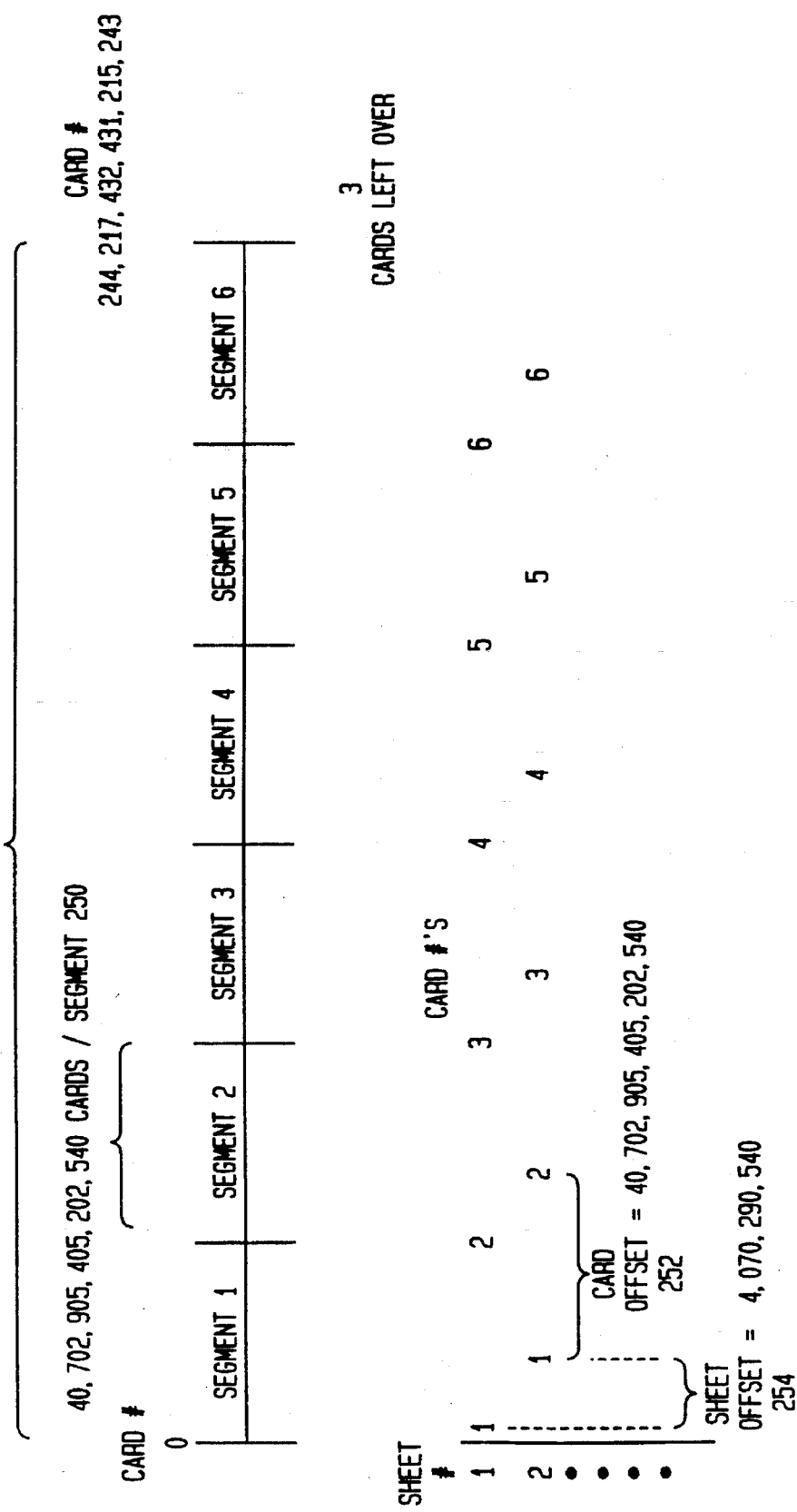
FIG. 5 illustrates the Bingo Card Selection Process.

FIG. 5 illustrates a table of all the 244 quadrillion possible bingo cards. If the sheets of bingo cards are to be printed with sets of six cards on each sheet the total number of cards is divided into six segments; this number is called the said card offset 250. If ten million sheets are to be issued then every ten millionth card in a segment is assembled for printing onto each consecutively numbered sheet of cards.

For example, there are 244,217,432,431,215,243 (Base 10) possible bingo cards. Each segment set up for six bingo cards on a sheet contains 40,702,905,405,202,540 cards the card offset 252. If 10,000,000 sheets are to be printed then every 4,070,290,540th card the sheet offset 254 is selected from each segment and printed on the one sheet of bingo cards. The computer moves pointers within the Table of 3003 to count in base 3003. This counting process is analogous to our decimal counting. The computer has five pointers rotating through the Table of 3003. The first pointer represents the $3003^0$ or O column, the second pointer represents the $3003^1$ or G column, the third pointer represents the $3003^2$ or N column, the fourth pointer represents the $3003^3$ or I column, the fifth pointer represents the $3003^4$ or B column. These columns are similar to our 1's column ($10^0$) 10's column ($10^1$), 100's column ($10^2$) and 1000's column ($10^3$) in base 10. When the computer is counting in base 3003 it increments the first pointer by one and if the first pointer was at 3003th location it places that pointer at the 1st location and increments the second pointer by one. Therefore, the computer calculates the contents of a specific bingo card by taking its decimal number ie. where it is within the 244 quadrillion bingo cards and converting that to base 3003. The base 3003 number provides the five pointer locations required to define that bingo card. This conversion between different number systems is covered in most computer science or general mathematics textbooks. IE Knuth, Donald Erwin. Pg. 300. *The Art of Computer Programming*. 2nd Ed. Addison Wesley. 1938.

In our previous example the first card on sheet number 1 is the 4,070,290,540th card of segment one and converting that card number to base 3003 has the following positions in the Table of 3003: 0001, 0001, 0451, 1055, 0316. The first two columns are 0001 because $3003^4$ or $3003^3$ are too large to divide into 4,070,290,540. Thus starting at $3003^2$ which divides into 4,070,290,540 a total of 0451 times with a remainder of 3,168,481. That remainder is divided by $3003^1$. The result of that calculation is 1055 with a remainder of 0316 which represents the $3003^0$ column. The base 3003 representation of 4,070,290,540 is 0001,0001,0451,1055, 0316. Taking the five unique numbers between 1 and 15 that the base 3003 numbers pointed to and placed these in a bingo card after they were scaled upward we have the 4,070,290,540th bingo card of segment 1. To verify the conversion between bases:

$$0001*3003^4+0001*3003^3+0451*3003^2\ 1055*3003^1+0316*3003^0= 4,070,290,540 \text{ (base 10)}.$$

The second card is 40,702,905,405,202,540 cards away from the first card and likewise for the rest of the six bingo cards. The computer just moves the pointers in the Table of 3003 to jump to the next card. Another way to look at this process is to view the computer as using base 3003 arithmetic. After all six cards have been selected the computer places the pointer back at the first card of the set of six cards and moves the pointers in the Table of 3003 to the first card of the next sheet by moving the pointers by a distance of the sheet offset.

It can be seen that the computer system generates any card of the 244 quadrillion possible total bingo cards by converting the cards base 10 number to base 3003 and looking up the five numbers in the Table of 3003 and adding the appropriate multiple of 15 to each number to correct for the column offset under the 'I', 'N', 'G', 'O'.

Each card in the top left hand position on each sheet of bingo cards is far removed from the similarly placed card on the next sheet. This lack of clustering produces winning bingos on a even basis. This invention allows the bingo organizer to claim that every bingo card printed on a sheet has no duplicate.

Figure 6:
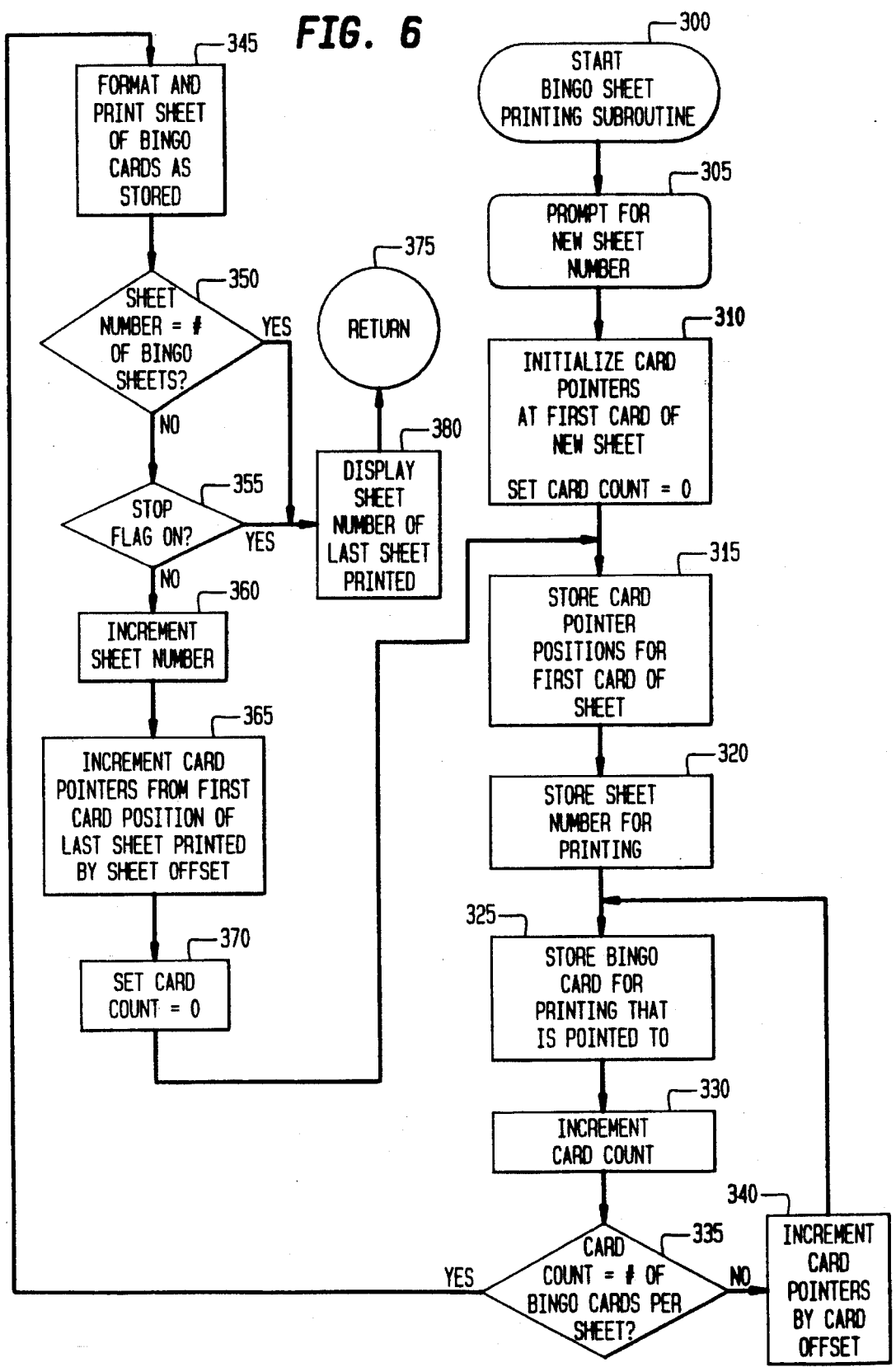
FIG. 6 is a flow chart of the Bingo Card Printing Subroutine.

The Bingo Game Printing Subroutine is illustrated by FIG. 6 and begins at 300 with the Start of the Printing Subroutine. The computer prompts for a new sheet number to start printing at 305. Step 305 is included if there is a problem with a printer or to restart the printing process. A set of 5 pointers is located in the Table of 3003 to point to the contents of the first card of the sheet of bingo cards to be printed and the card count variable is set to 0 310. The card count variable keeps track of the number of cards placed on a sheet of bingo cards. At 315 the location of the first card pointers are stored so that the card pointers can be reset to this position in the Table of 3003 at 365. The sheet number is then stored for printing when the sheet of bingo cards is printed 320. The bingo card which is being pointed to by the card pointers is then stored for printing 325. The card count variable is incremented after storing the bingo card 330. A decision is made whether the card count variable equals the number of bingo cards per sheet 335. If this decision is no increment the card pointers by the card offset to obtain the next card 340 then the program loops back to 325. If the card count variable is equal to the number of bingo cards per sheet then the computer formats the stored bingo cards for printing by the laser printer. The formatting process places the stored bingo cards in the correct location on the sheet, incrementing the numbers in the columns under the 'I', 'N', 'G', 'O' by the appropriate multiples of 15, and positions the sheet number on the set of bingo cards 345. The paper for the sheet or bingo card is preprinted with the bingo card outlines and any other advertising or information which is the same for every sheet of bingo cards. The computer then determines if the sheet just printed is the last sheet to be printed 350. If it is the last sheet then the computer displays the sheet number of the last sheet printed 380 and returns to the main program 375. If its not the last sheet at 350 then the computer checks to see if the stop flag has been set 355. If the stop flag has been set it displays the last sheet printed 380 and returns to the main program control 375. If the stop flag at 355 was not set the computer increments the sheet number 360 for the next sheet of bingo cards to be printed. The computer then moves the card pointers to the locations stored at 315 and increments the card pointers by the sheet offset 365. This is accomplished by placing the card pointers at the first card of the last sheet and increments the card pointers by the sheet offset. The card count variable is set to 0 and the computer system starts to generate a new sheet of bingo cards 370. The computer loops back to 315 and records the positions of the card pointers.

In certain embodiments of the invention it may be more convenient to print the bingo cards to a removable storage medium to be more conveniently printed at a remote site.

FIG. 7 shows the first bingo card on the first sheet of bingo cards for our example of 6 sheets per card and 10,000,000 cards are to be printed.

For a player to enter a game they input their sheet number into the system for the computer to regenerate their bingo cards. To reduce entry error the sheet identification number should be the smallest number of digits necessary. The 20 digit 3003 representation of the sheet number is too long to be acceptable. Instead each sheet is numbered sequentially in Base 10 which indicates how many sheet offsets it is away from the beginning sheet. Thus, a player is only required to enter a relatively small number of digits to enter the bingo game.

It is possible for the registration number of the bingo sheet to be up to 9 digits in length for a national bingo game across United States. Inputting a number this long on a Touch Tone (DTMF) telephone or speaking it over the telephone for manual input into a terminal by a customer service representative is prone to human error. A check digit appended to the sheet identification number is verified by the computer system on entry to ensure that the sheet registration number is entered correctly. If an incorrect entry is detected the computer informs the player or the operator and requests a correction.

The system records in the player database an indication if the player called in by Touch Tone telephone so that subsequent calls from the system to the player take the possible lack of Touch Tone input into account.

One of the objectives of the invention is to allow a player to reuse the sheet of bingo cards multiple times without requiring the player to purchase a new card for every play. To accomplish this each sheet is laminated between two sheets of plastic so that erasable daubers mark the bingo numbers as they are called. At the end of a bingo game these marks are erased using a soft cloth and the sheet is ready to play the next game. The lamination provides structural strength to the sheet for a player to play conveniently from their lap in front of the television set. The erasable dauber is attached to the laminated sheet so it is not lost or used for non-bingo game purposes. The laminated sheet also has instructions and revenue generating advertisements printed on either side. The physical size of the sheet and attached dauber stops it from being lost so that it is always ready beside the television set for the next game. Holographs embossed in the plastic lamination of the sheet of bingo cards or attached to the bingo cards under the lamination protect against fraud.

The preferred method of entry is through a '900' number service operated by the telephone company. The '900' service generates a charge to the players telephone bill for the designated amount to play bingo. Included in this preferred method is the input of all numbers via a Touch Tone (DTMF) telephone so that operator intervention and manual input although available under this invention are not required. For players without a Touch Tone (DTMF) telephone voice recognition of the players voice input is the preferred input method. Manual input by a human operator bridged by the telephone system to the player is also acceptable.

Figure 8:
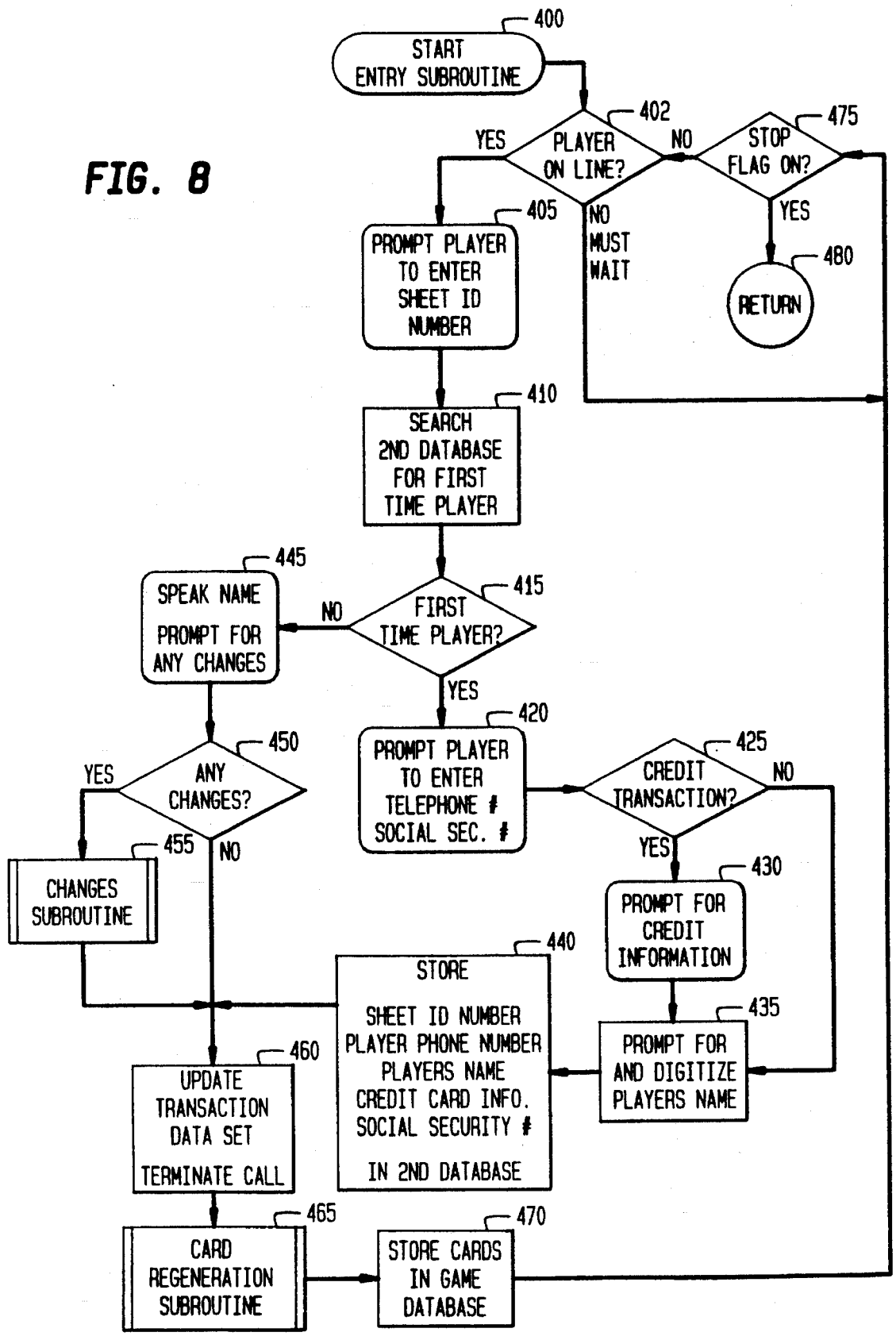
FIG. 8 is a flow chart of the Player Entry Subroutine.

FIG. 8 illustrates an overview of the Bingo Game Entry Process. The subroutine starts at 400 and waits until a player calls in and is connected to a telephone port 402. The player is prompted for their sheet identification number 415. The computer then searches the Bingo Sheet Data Set of the Bingo Game Database (2nd Database) 410 to determine if the player's sheet has been previously played 415. If the sheet is being played for the first time the computer prompts the player to enter their telephone number as a player identification number, in situations where entry by minors is of concern the system requires the input of a social security number, credit card number, or other indication of age 420. The computer determines whether the transaction is a credit transaction or a '900' number transaction 425 by the phone number dialled and the player. If the transaction is a credit transaction the player is prompted for their credit information 430. Whether the transaction is a credit transaction or not the first time player is prompted to speak their name which is digitized 435. All of the player information: social security number, the telephone number, credit information, sheet identification number, authorization to use an agent, and the digitized record of the players name is stored in the appropriate Data Sets of the Bingo Game Database (the 2nd Database) 440.

If the players sheet was not being played for the first time 415 the player's name as recorded in the Bingo Sheet Data Set of the Bingo Game Database is spoken and the player is asked 445 whether the player wishes to change any of the entry information from the last entry. If the player has no changes 450 they are prompted to confirm their name by pressing the digit '1' on their Touch Tone (DTMF) telephone and terminating the call 460. It should be noted that if the player is a credit card player then the player does not have to enter a credit card number for another game of bingo if the same credit card is to be billed. If they have changes to be made the player presses the digit '2' on their Touch Tone (DTMF) telephone and the computer proceeds to the Changes Subroutine 455.

The Changes Subroutine changes any of the players information such as the players name, social security number, telephone number, and credit information. From 440 a first time play of a sheet of bingo cards or 455 following the Changes Subroutine the computer updates the Transaction Data Set in a preferred embodiment which encompasses the date and time of the transaction, the transaction type, and a digital recording of the transaction 465. The computer terminates the call at this point and obtains credit authorization for credit card players 460. The bingo cards are regenerated from the Sheet Identification Number using the Card Regeneration Subroutine 465. The regenerated bingo cards are stored sequentially in the Game Card Database in the order they were printed on the sheet.

The order of the Game Card Database allows the computer to calculate the sheet identification number providing an index to the other databases and data sets in the databases without having to store these indexes. Since the cards are stored sequentially in sets in the Game Card Database the computer determines the first card in the set of bingo cards representing a sheet and from the first card the sheet identification number is calculated.

Individual card identification is used so that players have the choice to only play specific cards from their sheet. If the cards were numbered as they were sequentially placed on the bingo card the player is able to enter only the cards they wish to play.

Once the bingo cards are stored in the Game Card Database 470 the computer determines if the Stop Flag has been set 475. If the stop flag has been set it does not answer any new calls and returns to main control 480. If the Stop Flag has not been set the computer determines if another entrant is ready to enter 402. If there is no entrant the computer loops to 475 to check the stop flag. If there is an entrant ready the whole Bingo Game Entry Process is started over again at 405.

A players name alternatively is determined by the user typing in their name using the alphabetic characters on the Touch Tone (DTMF) keys of the telephone. The players name as decoded from this input is played back for verification and to sort out possible duplicates caused by multiple alphabetic characters on each Touch Tone (DTMF) key. If a players name doesn't exist in the name database it is automatically acquired, digitally recorded, indexed by the Touch Tone (DTMF) code and stored in the name database. This information acquisition system is utilized to gather address and other information as well as names.

The entry system of the computer has the capability to allow players to enter multiple games or to reschedule their entries they have already made to other dates of play. For example a player might enter every game in the month of May and then reschedule or cancel their entry for the game on May 20th. Thus the user has complete control over when they wish to play and the ability to change their entries due to outside circumstances.

In certain embodiments the telephone system uses a rotary dial recognition system for players without Touch Tone telephones to acquire the player information for both the automatic and semi-automatic systems.

Another system enables players to obtain credit from the bingo game organizer in advance of playing bingo that is debited for the charges to play bingo each time the player enters a bingo game.

Figure 9:
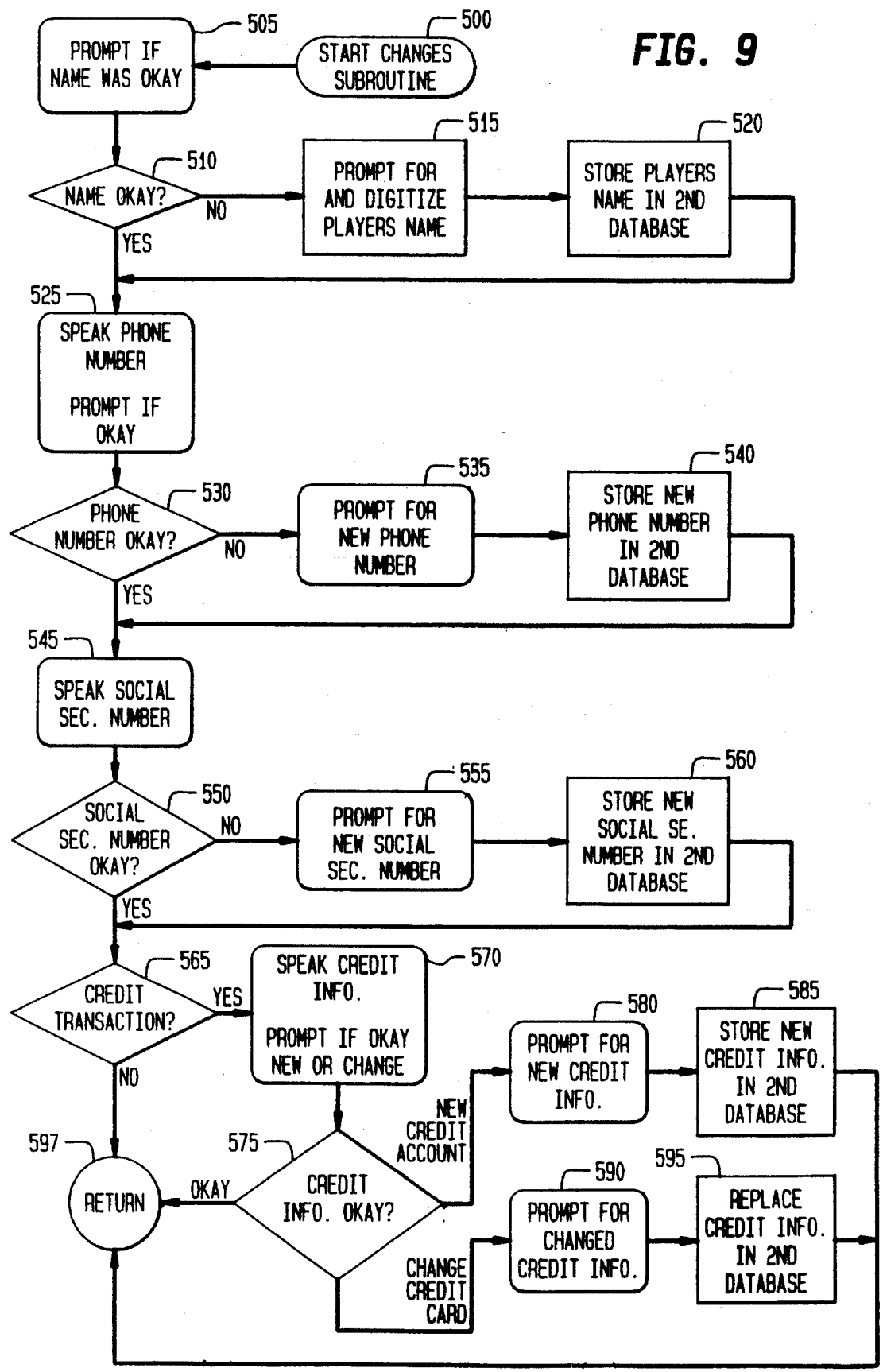
FIG. 9 is a flow chart of the Player Information Changes Subroutine.

FIG. 9 illustrates the Changes Subroutine which starts at 500. Since the players recorded name has already been spoken during the Entry Subroutine the computer prompts if the players name as spoken is theirs or okay 505. The player indicates that their name is not okay 510 the computer proceeds to 515 and records their name. The computer stores the new name in the Bingo Sheet Data Set of the Bingo Game Database (2nd Database) 520 and proceeds to 525. If the players name is okay at 510 the computer speaks the phone number and prompts if the phone number is okay 525. If the phone number is okay the computer speaks the players Social Security number 545. If the players phone number 535 incorrect then the computer prompts for a new phone number 535 which is stored in the Bingo Sheet Data Set of the Bingo Game Database (2nd Database) 540 and proceeds to 545 where the players Social Security Number is spoken. The computer then prompts if the Social Security Number is correct 550. If the Social Security Number is incorrect the computer prompts for a new Social Security Number 555 and stores it in the Bingo Sheet Data Set of the Bingo Game Database (2nd Database) 660. In Canada this number is the social insurance number. The computer determines if the transaction is a credit transaction at 565 whether it comes from 660 or if the Social Security Number was correct. When the transaction is not a credit transaction the computer returns to the Entry Subroutine. When the transaction is a credit transaction the computer speaks the last credit information which was used to bill the player's last bingo game 570. The computer then prompts the player to decide whether the player wants to use the identified credit method, if they want to change the credit method information, or if they want to enter a new credit information for billing purposes 575. If the credit method identified is correct the computer returns to the entry subroutine 597. If the player wants to enter a new credit account the computer prompts for the new credit account information 580 and stores it in the Credit Data Set of the Bingo Game Database 585, and returns to the Entry Subroutine 597. When the player wants to change the credit method they are using the computer prompts for the changes to the credit information 590 and records it in the Credit Data Set of the Bingo Game Database 595 after which the computer returns to the Entry Subroutine 597.

In a preferred embodiment the player does not have to input their home telephone number if the telephone company provides the Automatic Number Identification service (ANI). This ANI service is also date and time stamped and digitally stored for security.

The ANI (Automatic Number Identification) service when delivered over the telephone companies ISDN (Integrated Services Digital Network) provides the callers telephone number between the four second dial ringing intervals. This allows the computer system to look up the potential player in the second database to determine if they have paid their telephone bills for the charges to play bingo. If they have not played the computer system directs the telephone system to disconnect these players with a voice response message if .desired prior to any '900' charges being accepted by the system.

Figure 10:
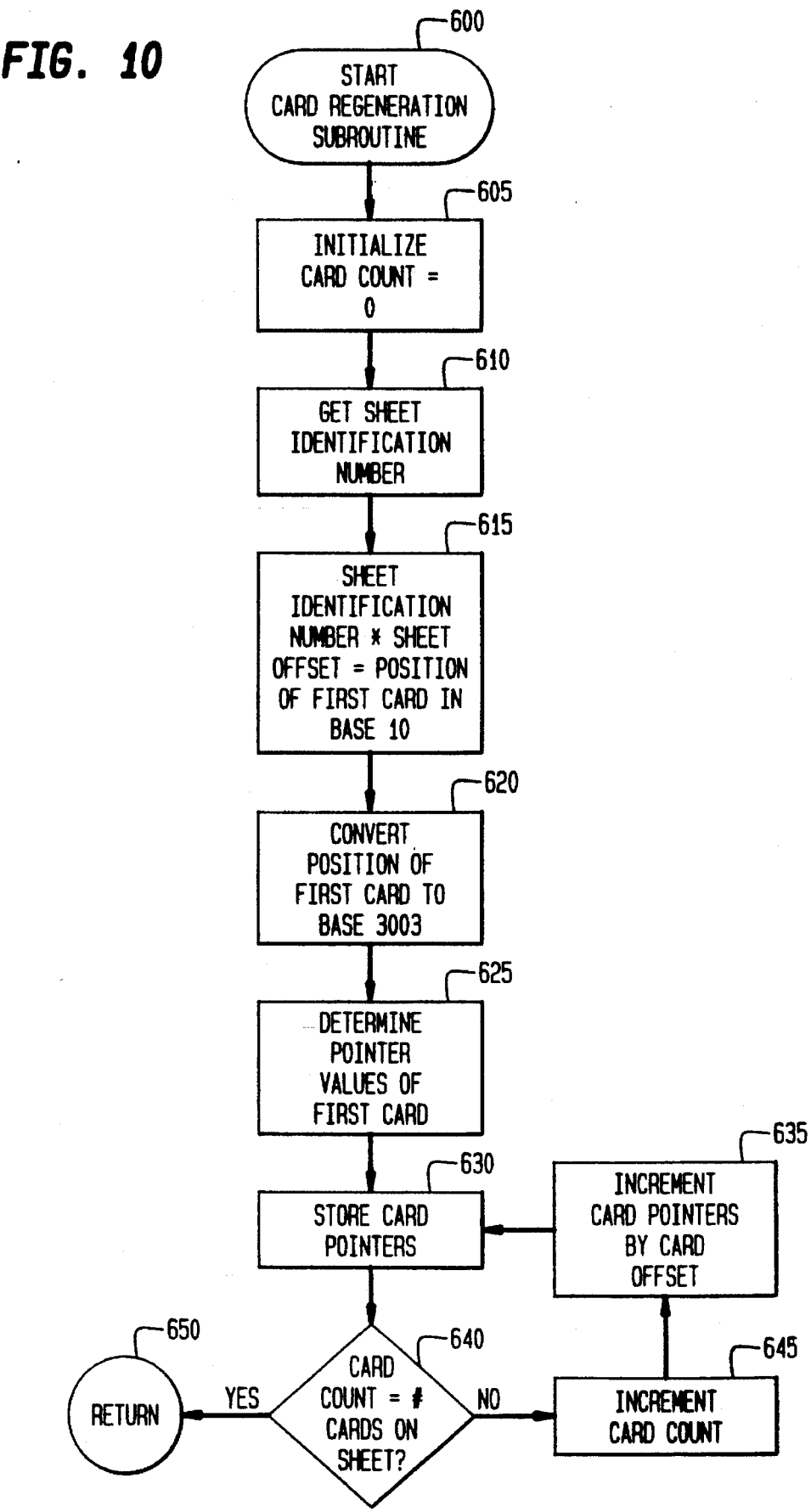
FIG. 10 is a flow chart of the Bingo Card Regeneration Subroutine.

FIG. 10 illustrates the Card Regeneration Subroutine which regenerates the players bingo cards from the Sheet Identification Number, associates 12 bingo counters with each individual bingo card, and stores the cards and bingo counters in the Game Card Database ready for play. The Card Regeneration Subroutine starts at 600. 605 initializes the card count to 0. The computer obtains the Sheet Identification Number at 610 and multiplies it by the Sheet Offset to obtain the position in base 10 within the 244 quadrillion bingo cards of the first bingo card on the sheet 615. The base 10 representation of the bingo card position is converted to base 3003 620 to obtain the bingo card pointer locations within the Table of 3003 625.

Figures 13, 14:
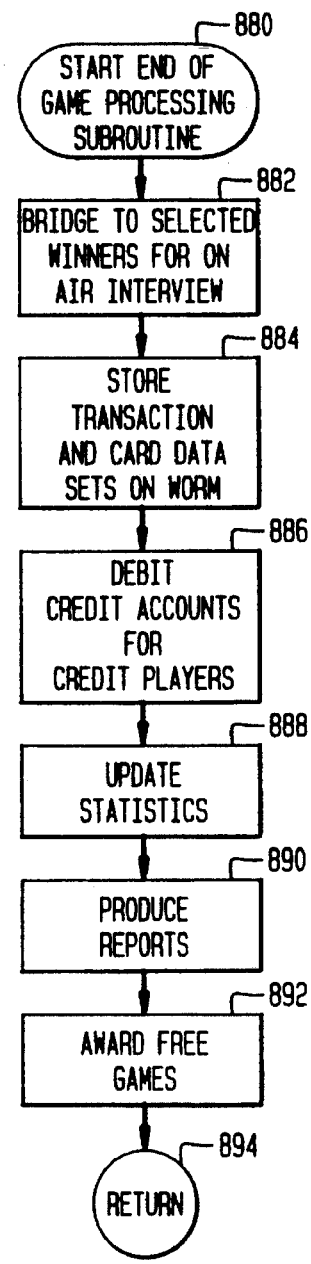
FIG. 13 illustrates the Bingo Counters used to determine winners.
FIG. 14 is a flow chart of the End of Game Processing Subroutine.

Instead of storing all the data from the complete bingo card only the location of the card pointers is stored to decrease the memory requirements of the processing system from 25 integers to 5 integers plus the 12 counter integers. Even the 5 plus 12 integers or 34 bytes (272 bits) are able to be further reduced by bit mapping to compress down to 96 bits in total or 12 bytes per bingo card record. The 96 bits are made up from five 12 bit words for the pointers and twelve 3 bit counters. The twelve bingo counters are initialized to 0 and stored with each bingo card. The first five counters represent the five vertical rows of the bingo card, the second five bingo counters represent the five horizontal columns on the bingo card, and the eleventh counter represents the left to right diagonal on the bingo card with the twelfth counter representing the right to left diagonal as illustrated in FIG. 13. When specific bingo counters reach 5 a potential winning bingo pattern is created. For example if any of the bingo counters reach 5 there is a straight line five in a row bingo on that card. If the two diagonal bingo counters both equal 5 then that card has an 'X' pattern. If all the bingo counters equal 5 the whole card is filled in.

After storing the card 630 the computer determines if all the cards contained on the sheet have been regenerated and stored 640 by comparing the card count variable to the number of bingo cards contained on a sheet. The number of bingo cards per sheet is stored in the Table of Sheet Information. If all the cards have been regenerated and stored for that sheet of bingo cards the computer returns to the Entry Subroutine 650. If all the sheets have not been regenerated and stored then the card count is incremented by 1 645 and the computer increments the card pointers by the card offset to point to the next card 635. The increment operation is calculated by using the card offset in base 3003 and doing base 3003 arithmetic by adding the card offset to the position of the card pointers to move to the next card. The computer loops back to 630 and stores the location of the card pointers. The card from the first segment is regenerated first followed by the card from the next segment and so forth.

Figure 11:
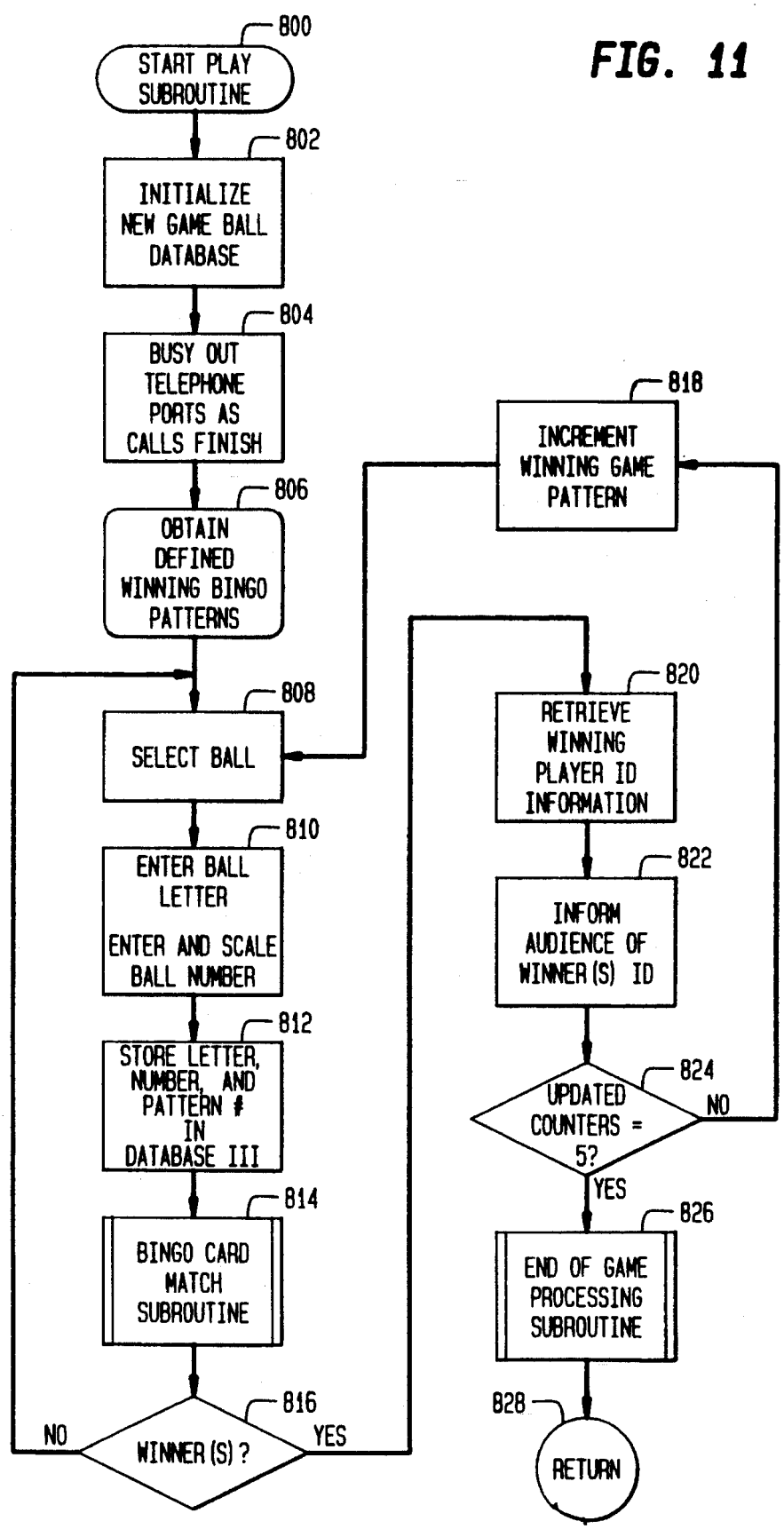
FIG. 11 is a flow chart of the Bingo Game Play Subroutine.

FIG. 11 illustrates the Bingo Play Subroutine starting at 800. The first process of the Bingo Play Subroutine is to initialize the Game Card Database, and initialize a new Game Ball Database 802. All the telephone ports within the system are busied out as the calls on the lines are finished 804. Preventing players or play along players from calling in while the game is in progress allows the support computer system processors to use all of their capacity on the Play Subroutine. The computer then prompts for the definition of the Winning Game Pattern(s) 806 or obtains them from a file. The Winning Game Pattern(s) represents the defined pattern on the bingo card which must be fulfilled to determine a winner. For example, if there were three games defined, the first game requires a 5 ball straight line bingo (conventional bingo); the second game requires players to fill in the square of numbers around the outside of the bingo card; and the final game requires the bingo card to be entirely filled. The Winning Game Patterns are defined by specifying which of the twelve bingo counters FIG. 13 must reach 5 to win. A file is created which is read in to the computer which completely defines the Winning Game Patterns. This file can be changed at any time before each game 806. Otherwise the computer automatically reads in this file without any human intervention.

At the appropriate time the first bingo ball is selected 808. In the non-automatic system the bingo ball is selected by a mechanical bingo ball selector which is operated by the announcer. A picture of the selected bingo ball is then broadcast to the television audience. In the automatic system the bingo balls are randomly generated. A graphically generated picture of the bingo balls with associated text overlays and audio is then broadcast to the television audience.

Regardless of the system used the selected ball letter and the scaled ball number are entered or made available to the computer system 810. In the non-automatic system this is manually input and in the automatic system internally determined by the computer system. The ball is scaled down to between 1 and 15 because all the numbers pointed to in the Table of 3003 are between 1 and 15 and the scaling operation only has to occur once per ball selected.

The selected ball letter, the scaled ball number, and the current Winning Game Pattern are stored in the Game Ball Database as the balls are selected for later retrieval by the Play along Subroutine 812.

While the selected bingo ball is broadcast to the television audience the computer system searches through all the bingo cards in the Game Card Database to determine the matches for the selected bingo ball 814. This is accomplished by the Bingo Match Subroutine FIG. 12.

Once all the cards have been searched for the selected bingo ball and all the bingo counters have been incremented the computer determines if there has been a winner 816. The computer determines if there is a winner by the sheet identification numbers returned from the Bingo Match Subroutine. If there is no winner the computer selects the next ball 808. If there is a winner the computer retrieves the winning player(s) identification information 820 and informs the audience of the winners 822. The computer then decides if the last win represented the End of Bingo Game 824 and if all the Winning Game Patterns are completed. If the Bingo Game is at an end the computer goes to the End of Game Processing Subroutine 826 and returns to Main Program Control 828. If the game is not at an end the Winning Game Pattern is incremented to the next pattern 818 and the next ball is selected 808. If the same player wins multiple games in the same program they win a super prize. For example if there were three games and a player won all patterns with the same bingo card or with different bingo cards on the same sheet of bingo cards the player wins a bonus prize on top of the regular prizes awarded for the individual wins.

Figure 12:
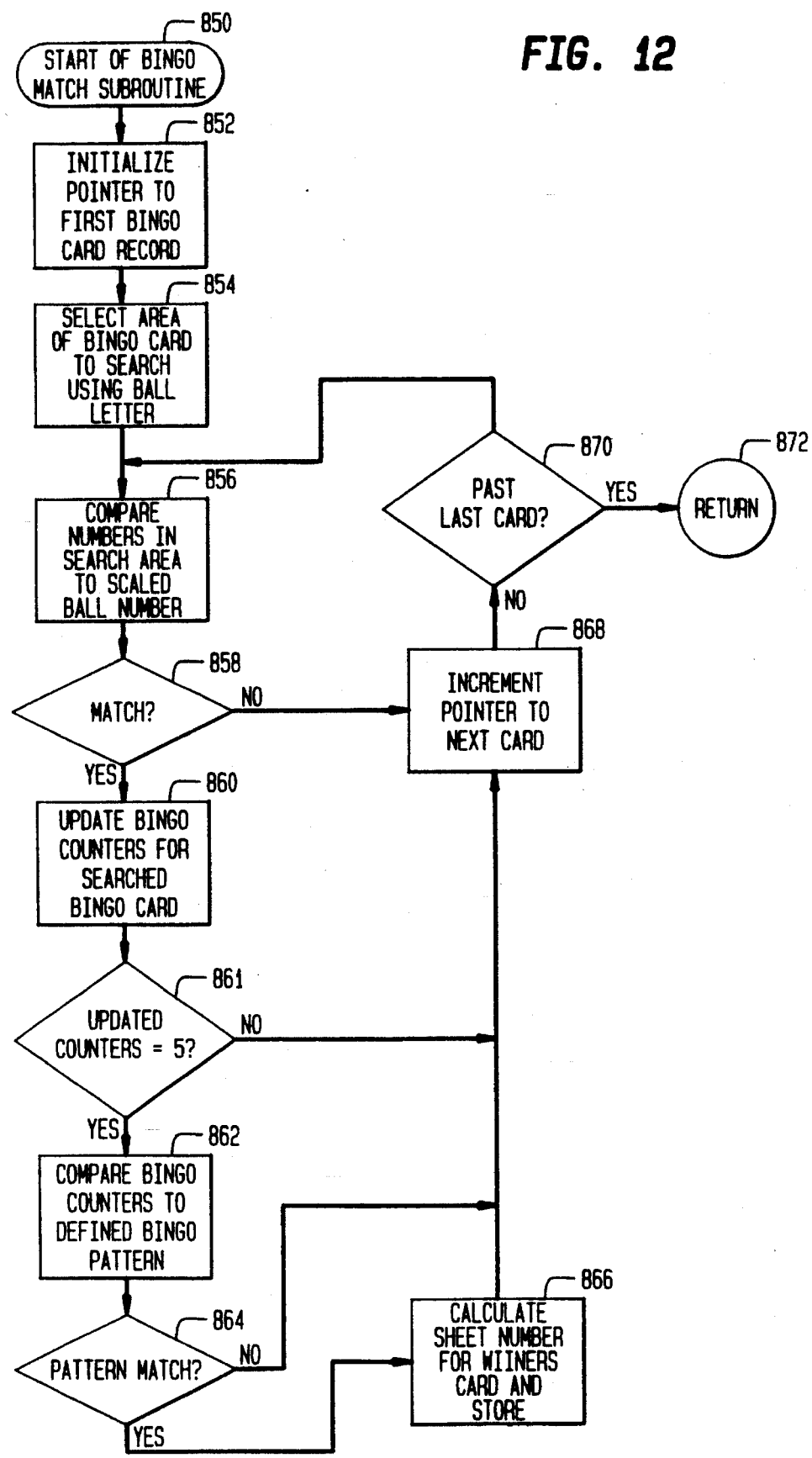
FIG. 12 is a flow chart of the Bingo Card Winning Match Subroutine.

FIG. 12 illustrates the Bingo Game Match Subroutine which starts at 850. The Bingo Game Match Subroutine processes all of the bingo cards stored in the Game Card Database and attempts to match the selected bingo ball with the card numbers and updates the appropriate bingo counters when a match is found. The computer initializes the pointers in memory to the first card in the Game Card Database 852. Using the selected Ball Letter the appropriate column on the bingo card is selected to search for the scaled ball number 854. The decision of which column to search occurs only once for each ball selected thus decreasing the computer processing time. The computer searches the five numbers in the column for the scaled ball number 856. In the preferred embodiment a specific search pattern is used to optimize the search speed. One method to search the column of five numbers is to sequentially go up or down the column respectively depending on whether the number being searched for is less then 8 or greater than 8. If the number being searched for is greater then or less then the number in the first box searched the computer chooses to stop the search if certain criteria are met. If the computer was searching for the number 2 it searches down the column of five numbers starting at the first box. If that box contained the number 3 the search stops because there is no possible way the number 2 is in that set of five numbers because the set of five numbers are sorted in ascending order. Likewise if the computer was searching for the number 10 it searches up the column of five numbers staring at the lowest box. If that box contained the number 9 the search stops because there is no possible way that the number 10 is in that set of five numbers because the set of five numbers is sorted in ascending order. Using this search strategy the computer determines if there is a match within the column of numbers 858. If there is a match the computer updates the appropriate bingo counters associated with the searched bingo card 860. The bingo card counters which are incremented is determined by the column and row position of the matched number on the card. For example if the matched number was in the 3rd row and 3rd column then the 3rd bingo counter, the 8th bingo counter, and the 11th and 12th diagonal bingo counters are incremented by one. When one of the bingo counters reach five 861 the bingo counters are compared to the currently defined Winning Game Pattern in play 862 and 864.

The sheet number is calculated if the bingo counters match the Winning Game Pattern 866. This calculation is done by finding the first card listed in the database for the winning player. Since the cards are stored sequentially and if there were 6 cards per sheet the computer accesses the first card of every sheet by referencing every sixth card in the Game Card Database. Once the first card of a sheet of bingo cards is found the Base 3003 representation of the bingo card is converted to the Base 10 representation of the bingo card and then divided by the sheet offset to provide the sheet number of that particular card. The sheet number is then stored.

If there is no match on the card being searched 858, or no pattern match 864, or the computer has recorded the sheet identification of a winner 866, or if the counter(s) didn't increment to five 861 the computer increments the pointers to the Game Card Database to process the next card 868. If all the cards in the Game Card Database have been searched 870 the computer returns to the Bingo Play Subroutine 872. If there are still more cards in the Game Card Database to search the computer loops and searches the next card 856.

Since the computer system knows the winners instantaneously, a telephone winner confirmation process is not required therefore it is practical to have follow along winners after the first bingo win. For example the players obtaining a bingo on the next ball called after an original bingo win a smaller consolation prize. This concept increases the number of winners in the mass audience bingo game and assists in maintaining player interest.

FIG. 13 illustrates the bingo counters associated with a bingo card. The numbers within the squares of the bingo card illustrated in FIG. 13 indicate the counters which are incremented when a selected bingo number matches a bingo number located on that position on the bingo card. All counters in the position on the bingo card are incremented. For example, if the selected bingo number matched the number in the center square of the card then horizontal counter 3, vertical counter 3, diagonal counter 11, and diagonal counter 12 are incremented (FIG. 13). When one of the counters reaches five there has been a five in a row straight line bingo, Thus, when different counters reach five different patterns occur on the bingo card.

FIG. 14 illustrates the End of Game Processing and starts at 880. At 882 the computer bridges to selected winners of the bingo game just finished. For example, the computer searches the Bingo Game Database in the Bingo Sheet Data Set for the winners name and telephone number. The computer telephones the winner and by voice response informs them of their winning status. Alternately, the computer bridges the winner to the television channel and using the voice response system carries out an automatic on air interview by sensing responses on the telephone line and speaking 'in between'. Alternatively, the computer bridges the winner to an on air announcer who performs the interview. Once all the interviews have occurred the computer writes all the Transactions and Credit Data Sets to a WORM (Write Once Read Many Times) disk 884. This is done for backup purposes as well as security against errors and fraud. The computer debits all the credit accounts for the credit players 886.

The computer updates all the relevant statistics in the Statistical Database 888. The statistics for the game just played are added to the historical data and any records that the game just set are also stored. Also, the Bingo Sheet Data Set is updated to record the players who had just played. The computer produces reports 890 to inform the organizers of all aspects of the bingo game: who won the individual games, how much the winners won, and the phone numbers of these winners. Other information is the total number of players, the total number of winners, how many players played using the 900 number, how many players used credit to play, and how many free games were played in this game versus how many free games were given out. A frequency plot of the players geographic location is obtained breaking the players telephone numbers into area codes and exchanges.

The computer system is immediately aware of all the player entered in the bingo game and makes this statistic available to the announcers and management. This feature also allows the computer system to calculate a variable set of prizes based on the number of entries which varies with the number of players.

The computer system records the selected players who receive free games. These players are chosen at any time based on varying criterion such as when they last played, when they received their last free game, and the frequency of their play. The computer targets those players who have played in the past but who have not played recently. The computer upon selecting these players turns on the Free Game Indicator in the Bingo Sheet Data Set in the Bingo Game Database 892 for these players. The computer system when taking entries for the next game determines by analyzing the 2nd database which players received a free game and enters these players into the next game without requiring the winner of the free game to phone in to enter the awarded free game. The computer returns to the Play Subroutine 894 which then returns to the Main Program Control.

As can be seen, various types of information are stored in different databases. An example of the types of information that can be stored in the databases is set forth in Appendix B.

Figure 15B:
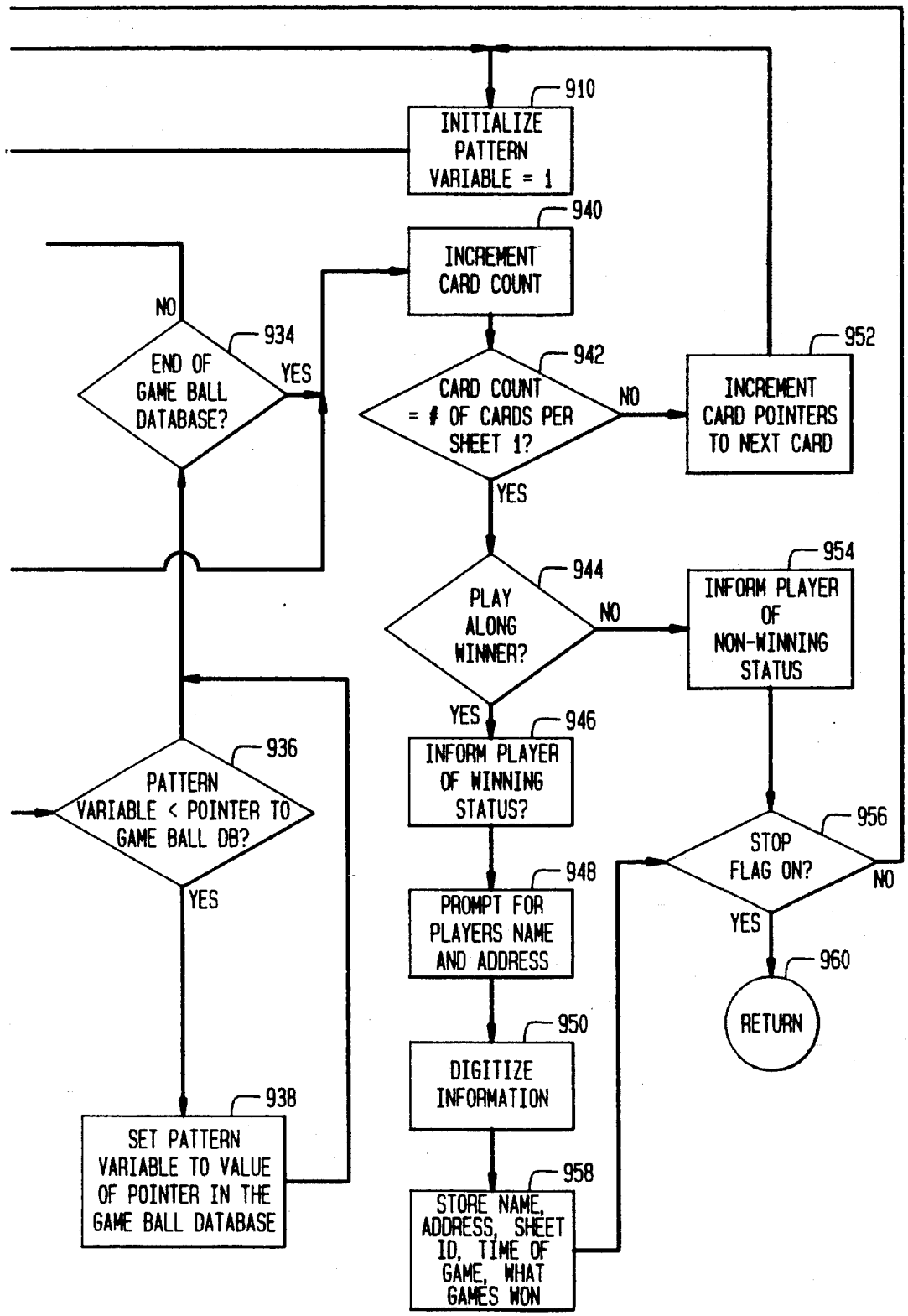

The Play Along Routine is illustrated in FIG. 15 and allows a player to phone in after the bingo game has been played and to play their bingo card against the called bingo balls as recorded in the Game Ball Database. If the play along player obtains one of the Winning Game Patterns before or simultaneously with the real winner of that game then the play along player wins a prize.

The play along player always attempts to match the bingo card pattern defined by the Pattern Variable in FIG. 14. The Winning Game Pattern differs from the Pattern Variable because the Winning Game Pattern defines the pattern which the television audience was on as each bingo ball was selected during the actual bingo game.

The play along player is prompted to enter their Sheet identification number using their Touch Tone (DTMF) telephone 902 or by bridging to a manual operator. The Card Regeneration Subroutine is called to regenerate the play along players bingo cards 904. (See FIG. 10 and accompanying discussion) The cards are stored with the associated counters and the card count variable is set to 0 906. The card pointers are initialized to the first bingo card of the play along player. The Pattern Variable is initialized to the first bingo card pattern 910. The pointers to the game ball database are initialized Three pieces of information come from the Game Ball Database: the Bingo Ball Letter, the Bingo Ball Number, and the Winning Game Pattern. The area of the bingo card to search is selected using the Bingo Ball Letter 914 the number searched for is selected using the Bingo Ball Number 916. If the number is matched 918 in the search area the associated Bingo Counters are incremented (See Play Subroutine) 928 and if one of the counters is incremented to five 929 the Bingo Counters are compared against the bingo card pattern represented by the Pattern Variable 922. If there is a pattern match 922 then the play along player has won the game before the real players did. The card count number is then stored along with the winning status of the player 926. The Pattern Variable is then incremented 924 and the Pattern Variable is compared to the total number of patterns to be played 922. If there are no more patterns to play ie. the total number of patterns is less then the pattern variable the computer proceeds to the next card 940. If there are more patterns to play ie. the total number of patterns is greater then the pattern variable the computer increments the pointers in the Game Ball Database to the next ball 920. The computer then determines if the pattern variable is set to the correct pattern 926. If the pattern variable is less then the value of the pointer to the Winning Game Pattern in the Game Ball Database then the pattern variable is set to the value of the Winning Game Pattern. This process ensures the play along player plays against the same patterns used during the real game. The computer determines if the last ball from the Game Ball Database has been used 934. If the last ball has been used then the computer increments to the next card 940. If the last ball has not been used then the computer searches the card using the new ball from the Game Ball Database 914.

When the card count is incremented 940 indicating that the next card is to be examined the computer must check to ensure the computer has not processed all of the cards on the play along players sheet 942. If the computer has not processed all the cards the computer increments the card pointers to the next card 952 and processes that card 910. If all the cards have been processed the computer determines if the play along player was a winner with any of their cards for any of the games. If the play along player was a winner the card and game are stored 926 in a file. The play along player is informed of their win 946 and asked to speak their name and home address information 950. This information is digitized and stored on the computer system for later output to the bingo game operator 958. If the play along player is not a winner the play along player is informed 954.

The computer determines if the stop flag is on 956. If the stop flag is on the computer returns to Main Program Control 960. If the stop flag is not on the Play along Player Subroutine waits until another Play Along Player telephones in to play their card against the Game Ball Database.

This invention has been described as a television game show; however, nothing in the invention precludes it from being an automated radio show with all the information supplied to listeners without any visual information required. The broadcast means ranges from: radio means, two way cable, fibre optics, radio telephone, and satellite television broadcast means.

In an automated embodiment of the invention additional functionality is added by having prerecorded digitally stored announcer comments stored in an audio database for reassembly into appropriate comments during the game to interest and inform the audience about the progress of the bingo game. The voice of the telephone system is personalized to that of the announcer or of the computer generated pseudo announcer. The semi-automatic system passes historical statistics or the players recorded name to a live announcer to comment or use during the progress of the bingo game. All of the above historical information, players names, and comments are conveyed to the audience as well.

The system of this invention accepts lottery number or entries for other types of games and obtains player identities for transmission or integration to a remotely located lottery game.

Players who have lost their sheet of bingo cards and know the sheet identification number of their card are able to have their sheet reprinted as required.

A Universal Bingo Card Standard is created using the information on the number of cards allowed on a sheet of bingo cards, the sheet offset, the card offset and the Table of 3003 which generate these cards. Any computer system using the Universal Bingo Card Standard has the ability to regenerate any Universal Bingo Card. This standard allows multiple levels of bingo games and bingo computer systems to access the same base of bingo cards. For example there might be national bingo games, provincial bingo games, and regional bingo games all accessing the same sets of bingo cards.

To operate as a mass audience television game show it is necessary to have mass distribution of the reusable sets of bingo cards. One method of achieving this is through a marketing system known as multi level marketing. With this marketing system sellers of bingo cards are provided an incentive of cash or free games based on their sales to others and the sale by others to on going successive levels of resale. As each person acquires a set of bingo cards they must be registered to play the first game. This registration process provides the means to establish and maintain the database requirements for a multi level marketing system. For example if a seller received a free game for the first sale dropping by half a free game for each successive level of sale the free games appear as follows.

| LEVEL | SALES | FREE GAMES |
|---|---|---|
| 1 | 1 | 1 * 1 = 1 |
| 2 | 1  1 | 2 * .5 = 1 |
| 3 | 1  1  1  1 | 4 * .25 = 1 |
| 4 | 1  1  1  1  1  1  1  1 | 8 * .125 = 1 |

The seller telephones in to the computer system at any time to determine the number of free games that have been accumulated to their account and exhort individuals to produce more sales to bolster their total number of free games.

In situations where the location of the bingo game is on an Indian reservation it may be advantageous to have all the facilities on one site for legal reasons. Current law allows Indian Bands to hold bingos without the same restrictions that apply to state and locally regulated local bingos. This invention envisions a TV bingo operated on a reservation being telecast nationally with the prize money commensurate with the number of players produced from a national TV game show. This game may require a player at home calling a '900' number terminated on the reserve to authorize a local agent to play the numerically identified set of bingo cards, and having the agent forward any prize money to the player by mail or other means. The agent plays all the sets of bingo cards for the remote players alongside of other on site bingo players and is informed by a screen attached to the computer system whether any of the players he represents are winners of the bingo game. The request to authorize an on site agent to play the players bingo card is input on the first time entry of the set of bingo cards and is digitally recorded to WORM (Write Once Read Many Times) disc for audit and verification purposes. On subsequent entries the player confirms the authorization for an on site agent to enter and play the indicated bingo cards.

Appendix A
Sample Table of 3003

| 1-1,2,3,4,5 | 14-1,2,3,5,8 | 27-1,2,3,6,12 |
|---|---|---|
| 2-1,2,3,4,6 | 15-1,2,3,5,9 | 28-1,2,3,6,13 |
| 3-1,2,3,4,7 | 16-1,2,3,5,10 | 29-1,2,3,6,14 |
| 4-1,2,3,4,8 | 17-1,2,3,5,11 | 30-1,2,3,6,15 |
| 5-1,2,3,4,9 | 18-1,2,3,5,12 | 31-1,2,3,7,8 |
| 6-1,2,3,4,10 | 19-1,2,3,5,13 | 32-1,2,3,7,9 |
| 7-1,2,3,4,11 | 20-1,2,3,5,14 | 33-1,2,3,7,10 |
| 8-1,2,3,4,12 | 21-1,2,3,5,15 | 34-1,2,3,7,11 |
| 9-1,2,3,4,13 | 22-1,2,3,6,7 | 35-1,2,3,7,12 |
| 10-1,2,3,4,14 | 23-1,2,3,6,8 | 36-1,2,3,7,13 |
| 11-1,2,3,4,15 | 24-1,2,3,6,9 | 37-1,2,3,7,14 |
| 12-1,2,3,5,6 | 25-1,2,3,6,10 | 38-1,2,3,7,15 |
| 13-1,2,3,5,7 | 26-1,2,3,6,11 | 39-1,2,3,8,9 |

Above are the first 39 entries in the Table of 3003.
Below are the last 39 entries in the Table of 3003.

| 2965-8,9,12,13,15 | 2978-8,11,12,13,14 | 2991-9,10,12,14,15 |
|---|---|---|
| 2966-8,9,12,14,15 | 2979-8,11,12,13,15 | 2992-9,10,13,14,15 |
| 2967-8,9,13,14,15 | 2980-8,11,12,14,15 | 2993-9,11,12,13,14 |
| 2968-8,10,11,12,13 | 2981-8,11,13,14,15 | 2994-9,11,12,13,15 |
| 2969-8,10,11,12,14 | 2982-8,12,13,14,15 | 2995-9,11,12,14,15 |
| 2970-8,10,11,12,15 | 2983-9,10,11,12,13 | 2996-9,11,13,14,15 |
| 2971-8,10,11,13,14 | 2984-9,10,11,12,14 | 2997-9,12,13,14,15 |
| 2972-8,10,11,13,15 | 2985-9,10,11,12,15 | 2998-10,11,12,13,14 |
| 2973-8,10,11,14,15 | 2986-9,10,11,13,14 | 2999-10,11,12,13,15 |
| 2974-8,10,12,13,14 | 2987-9,10,11,13,15 | 3000-10,11,12,14,15 |
| 2975-8,10,12,13,15 | 2988-9,10,11,14,15 | 3001-10,11,13,14,15 |
| 2976-8,10,12,14,15 | 2989-9,10,12,13,14 | 3002-10,12,13,14,15 |
| 2977-8,10,13,14,15 | 2990-9,10,12,13,15 | 3003-11,12,13,14,15 |

Appendix B
Example of Bingo Databases

I. Game Card Database
    1. Bingo Card Pointer Locations for each card.
    2. 12 Bingo Counters for each card.
II. Bingo Game Database
  Bingo Sheet Data Set
    1. Sheet identification number.
    1. Player telephone number.
    2. Players digitally recorded name.
    3. Social Security Number.
    6. Authorization for on site agent.
    4. Touch Tone Telephone Indicator.
    3. Plays this week, month, year, moving average, month ago. . .
    4. Free game awarded this week, month, year.
    5. Free game indicator for next game.
    7. Bad Credit Rating Indicator.
  Transaction Data Set
    1. Sheet identification number.
    2. Transaction time and date.
    3. Transaction type - 900 number, card, free. . .
    4. Digital recording of transaction.

5. Telephone Port # and Support Computer #.
      6. Authorization of an on site agent.
   Credit Data Set
      1. Player Identification Number. (sheet
         and telephone #'s)
      2. Card Number and Expiry Date.
      3. Account Balance.
   Transaction Set
      1. Player Identification Number.
      2. Transaction date and time.
      3. Card number and authorization number.
      4. Transaction Amount.
III. Game Ball Database
      1. Bingo ball letter.
      2. Scaled bingo number.
      3. Winning Game Pattern number.
IV. Statistical Database
      1. most balls for 1st bingo.
      2. least balls for 1st bingo.
      3. most balls for 2nd bingo.
      4. least balls for 2nd bingo.
      5. most balls for 3rd bingo.
      6. least balls for 3rd bingo.
      7. max. # of winners for 1st bingo.
      8. max. # of winners for 2nd bingo.
      9. max. # of winners for 3rd bingo.
      10. least # of players in a game.
      11. Others as required.

The embodiments of the invention in which an exclusive property or privilege is claimed are defined as follows:

1. A television game show system comprising:

(A) a computer system for generating a number of sheets each containing a preselected number of unique bingo cards from the pool of all potential bingo cards, for distribution to bingo players in a television station's viewing area, with each sheet having a unique identification number assigned thereto;

(B) storage means connected to the computer system to store the contents of said sheets of unique bingo cards with the associated identification number;

(C) at least one variable content printing means to print out said sheets of bingo cards;

(D) a telephone system for providing to the computer system information received via a telephone connection which pertains to at least an identification of a player and the sheet identification number for an associated sheet of bingo cards;

(E) means responsive to receipt of a sheet identification number for retrieving from said storage means (B) the contents of an associated sheet of bingo cards and for storing information in a first database relating to the retrieved contents of the cards on the associated sheet and the associated player identification that was received via the telephone connection;

(F) means to define to the computer system at least one winning pattern on a bingo card that is used to determine winners of a bingo game;

(G) means to randomly select bingo numbers one at a time from a pool of all seventy-five possible numbers;

(H) means to inform a television audience of the bingo numbers as they are selected;

(I) means to enter the selected bingo numbers into the computer system;

(J) means to determine if a selected bingo number matches a number that is included in the set of numbers on each bingo card whose contents is stored in said first database;

(K) means to determine if there is a pattern of matched bingo numbers on a card that is the same as a defined winning bingo pattern;

(L) means to determine the identification of a player associated with a winning bingo card; and (M) means to indicate the identification of the bingo game winner.

2. The system of claim 1 wherein said defining means defines multiple winning patterns.

3. The system of claim 1 wherein the computer system controls the variable content printer means to print out game-related information including statistics, a register of players entered in the game, copies of the winning bingo cards and accounting reports.

4. The system of claim 1 further including high speed data communication means for connecting one or more remotely located telephone systems to the computer system.

5. The system of claim 1 wherein the computer system stores transactions that are received by the telephone system in a first database for play of the bingo game and also stores these transactions in a non-volatile memory for historical reference.

6. The system of claim 1 wherein the telephone system maintains a database of telephone numbers of players that have called in to said system and at least one of an associated telephone number indicator, a bad credit indicator, and a playing frequency indicator.

7. The system of claim 1 wherein the telephone system acquires a player's telephone number through automatic number identification and transmits this information to the computer system where it is associated with the player's sheet of bingo cards for future identification of the player that entered the bingo card.

8. The system of claim 7 wherein the telephone system includes means to digitally record a player's spoken name and to transmit this information to the computer system where it is associated with the player's telephone number and sheet of bingo cards for storage and later retrieval.

9. The system of claim 1 wherein the telephone system includes means to acquire the player's telephone number and credit card information and to transmit this information to the computer system where it is associated with the player's sheet of bingo cards for storage and retrieval for accounting purposes.

10. The system of claim 1 wherein a player provides the system with a unique number and the system generates and prints a unique set of gaming cards associated with that number for the player.

11. The system of claim 1 wherein said means to select the bingo numbers includes means to randomly generate the numbers and graphic generating means for displaying bingo ball images of the generated numbers to the television audience, and wherein said telephone system includes voice generating means for informing the television audience of the generated bingo numbers by means of the audio portion of a television channel.

12. The system of claim 1 wherein the individual bingo cards on a sheet of bingo cards have further identification allowing a player to play individual cards and portions of a card instead of the whole sheet of bingo cards.

13. The system of claim 1 wherein the telephone system includes bridging means activated by the calling party to connect the calling party's telephone line to a customer service operator to provide assistance.

14. The system of claim 1 wherein the telephone system is connected to at least one of a two-way cable system, a fibre optic communication network, or a radio telephone system to acquire the bingo related information, in addition to a telephone network.

15. A method for televising a game show and enabling members of a television viewing audience to play the game, comprising the steps of:

(A) generating a required number of sheets each containing a preselected number of unique bingo cards from the pool of all potential bingo cards, with each sheet having a unique identification number assigned thereto;

(B) storing the contents of said sheets of unique bingo cards with the associated identification number;

(C) printing said sheets of bingo cards and distributing them to game players in a television viewing area;

(D) receiving information via a telephone connection which pertains to at least an identification of a player and the sheet identification number for an associated sheet of bingo cards;

(E) retrieving from storage the contents of an associated sheet of bingo cards and storing information in a first database relating to the retrieved contents of the cards on the associated sheet and the associated player identification that was received via the telephone connection;

(F) defining at least one winning pattern on a bingo card that is used to determine winners of a bingo game;

(G) randomly selecting bingo numbers one at a time from a pool of all seventy-five possible numbers;

(H) informing the television audience of the bingo numbers as they are selected;

(I) determining whether a selected bingo number matches a number that is included in the set of numbers on each bingo card whose information is stored in said first database;

(J) determining whether there is a pattern of matched bingo numbers on a card that is the same as a defined winning bingo pattern;

(K) determining the identification of a player associated with a winning bingo card; and (L) informing the television audience of the identification of the bingo game winner.

16. The method of claim 15 wherein the game consists of multiple winning patterns with prizes awarded to players that obtain one or more of the multiple patterns.

17. The method of claim 15 wherein further numbers are selected after an initial winner is determined to create additional winners in a particular game.

18. The method of claim 15 wherein participants in the game comprise both remotely located players who observe the game through television broadcasts and local players who are present at the site at which the numbers are selected.

19. The method of claim 18 further including the step of verifying that a player is a winning player by determining whether a sheet identification number associated with that player is registered for a given game and, if so, whether a card on the associated sheet contains a winning pattern.

20. The method of claim 15 wherein a bingo card and its associated identification number are universal in concept for use in multiple games conducted at different times on various regional bases with no connection between any games except the universal card.

21. The method of claim 15 wherein the bingo cards are printed on printers connected to one or more computers at one or more locations at multiple times in one or more physical formats.

22. The method of claim 15 wherein a computer system operated by a single player accepts a series of identification numbers that enables the computer system to regenerate bingo cards for those identification numbers for play of the regenerated bingo cards in the bingo game by the player.

23. The method of claim 15 further including the steps of storing transactions that are received by the telephone system in a first database in temporary memory for play of the bingo game and storing these transactions in a non-volatile memory for historical reference.

24. The method of claim 15 further including the step of maintaining a database of telephone numbers of players that have called in to register for a game and at least one of an associated telephone number indicator, a bad credit indicator, and a playing frequency indicator.

25. The method of claim 15 further including the steps of acquiring a player's telephone number through automatic number identification and transmitting this information to a computer system where it is associated with the player's sheet of bingo cards for future identification of the player that entered the bingo card.

26. The method of claim 25 further including the steps of digitally recording a player's spoken name and transmitting this information to a computer system where it is associated with the player's telephone number and sheet of bingo cards for storage and later retrieval.

27. The method of claim 15 further including the steps of acquiring a player's telephone number and credit card information and transmitting this information to a computer system where it is associated with the player's sheet of bingo cards for storage and retrieval for accounting purposes.

28. The method of claim 15 wherein a player provides the system with a unique number, and further including the steps of generating and printing a unique set of gaming cards associated with that number for the player.

29. The method of claim 15 wherein a non-paying player who has not entered a current game can play along as if a paid player and, upon obtaining a winning bingo pattern, can call to enter a sheet identification number, and including the steps of using the bingo sheet identification number to regenerate the play-along player's bingo cards and compare the numbers on the bingo cards to the bingo numbers that were drawn for that game to determine if the play-along player is a winner.

30. The method of claim 15 further including the steps of randomly generating the bingo numbers automatically by a computer system, displaying bingo ball images of these generated numbers to the television audience, and audibly informing the television audience of the generated bingo numbers by means of the audio portion of a television channel.

31. The method of claim 15 wherein the individual bingo cards on a sheet of bingo cards have further identification allowing a player to play individual cards and portions of a card instead of the whole sheet of bingo cards.

* * * * *